US012207266B2

(12) United States Patent
Shrivastava et al.

(10) Patent No.: US 12,207,266 B2
(45) Date of Patent: Jan. 21, 2025

(54) METHOD AND SYSTEM FOR EFFICIENT MCCH SIGNALING AND RECEPTION FOR MBS IN 5G NETWORK

(71) Applicant: SAMSUNG ELECTRONICS CO., LTD., Suwon-si (KR)

(72) Inventors: Vinay Kumar Shrivastava, Bangalore (IN); Rohan Raj, Bangalore (IN); Fasil Abdul Latheef, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 648 days.

(21) Appl. No.: 17/396,020

(22) Filed: Aug. 6, 2021

(65) Prior Publication Data

US 2022/0046687 A1    Feb. 10, 2022

(30) Foreign Application Priority Data

Aug. 6, 2020   (IN) .............................. 202041033701
Aug. 5, 2021   (IN) .............................. 2020 41033701

(51) Int. Cl.

| H04W 72/23 | (2023.01) |
|---|---|
| H04W 4/06 | (2009.01) |
| H04W 36/00 | (2009.01) |
| H04W 72/30 | (2023.01) |
| H04W 76/28 | (2018.01) |

(52) U.S. Cl.
CPC ............. *H04W 72/23* (2023.01); *H04W 4/06* (2013.01); *H04W 36/0061* (2013.01); *H04W 72/30* (2023.01); *H04W 76/28* (2018.02)

(58) Field of Classification Search
None
See application file for complete search history.

(56) References Cited

U.S. PATENT DOCUMENTS

| 8,588,123 | B2 | 11/2013 | Yi et al. | |
|---|---|---|---|---|
| 10,153,914 | B2* | 12/2018 | Lee | ........................ H04W 72/30 |
| 10,225,798 | B2 | 3/2019 | Lee et al. | |
| 10,375,757 | B2 | 8/2019 | Kim et al. | |
| 10,511,941 | B2 | 12/2019 | Hong et al. | |
| 10,785,752 | B2 | 9/2020 | Xu et al. | |
| 2012/0039233 | A1* | 2/2012 | Kim | ........................ H04W 72/30 |
| | | | | 370/312 |
| 2013/0294316 | A1* | 11/2013 | Amerga | .................. H04W 4/06 |
| | | | | 370/312 |
| 2014/0269566 | A1* | 9/2014 | Wang | .................. H04W 68/005 |
| | | | | 370/329 |

(Continued)

*Primary Examiner* — Jutai Kao
(74) *Attorney, Agent, or Firm* — F. Chau & Associates, LLC

(57) ABSTRACT

A method for MCCH acquisition in a 5G wireless network (1000) by a UE (100) includes: receiving, by the UE, a MCCH change notification from the gNodeB over a PDCCH. Further, the method includes detecting whether at least one of the UE is interested to receive a new MBS and the UE is already receiving an MBS. Further, the method includes determining the start of the new MBS session for the new MBS by reading the first bit of the MCCH change notification in response to detecting that the UE is interested to receive the new MBS, or determining the modification to the MBS session configuration of the ongoing MBS session by reading the second bit of the MCCH change notification in response to detecting that the UE is already receiving the MBS.

16 Claims, 27 Drawing Sheets

(56) References Cited

U.S. PATENT DOCUMENTS

| | | | |
|---|---|---|---|
| 2019/0029001 A1* | 1/2019 | Wang | H04W 72/30 |
| 2019/0208570 A1 | 7/2019 | Shrivastava et al. | |
| 2020/0045768 A1 | 2/2020 | He et al. | |
| 2021/0144797 A1 | 5/2021 | Zhang et al. | |
| 2022/0166590 A1* | 5/2022 | Li | H04W 52/0219 |
| 2023/0362960 A1* | 11/2023 | Adjakple | H04W 4/08 |

* cited by examiner

METHOD AND SYSTEM FOR EFFICIENT MCCH SIGNALING AND RECEPTION FOR MBS IN 5G NETWORK

CROSS-REFERENCE TO RELATED APPLICATIONS

This U.S. patent application claims priority under 35 U.S.C. § 119 to Indian Provisional Patent Application No. 202041033701 filed on Aug. 6, 2020 which claims priority to Indian Patent Application No. 202041033701 filed on Aug. 5, 2021 in the Indian Intellectual Property Office, the disclosures of which are incorporated by reference in their entirety herein.

TECHNICAL FIELD

The present disclosure relates to a wireless communication network, and more specifically related to a method and a system for efficient MCCH signaling and reception and a Discontinuous Reception (DRX) scheduling for a multicast broadcast service (MBS) in the wireless communication network (e.g., $5^{th}$ generation (5G) network).

DISCUSSION OF RELATED ART

In general, multicast/broadcast services are provided in wireless communication network like Long-Term Evolution (LTE) through a MBSFN (Multicast Broadcast Single Frequency Network) which is a multi-cell transmission technique or a SC-PTM (Single Cell Point to Multipoint) which is single cell technique as the name suggests. In LTE MBSFN and SC-PTM, there is control channel MCCH (Multicast Control Channel) to carry control/signaling information for multicast/broadcast service configuration purpose and data channel MTCH (Multicast Traffic Channel) to carry the actual traffic for multicast/broadcast services. There is a periodic transmission of the MCCH channel and for LTE MBSFN, Multicast/broadcast service mapped to the MTCH will follow a scheduling pattern.

More specifically, referring to the SC-PTM, the reception of services need to be informed to receiving UEs so that the UEs can adopt DRX (Discontinuous reception) when the desired service is not being transmitted. That implies, the multiple services being transmitted by the network will have their own DRX scheduling configuration. The DRX configuration consists of some timer configuration values, specifically DRX on-duration timer, inactivity timer and so on. The DRX on-duration timer is started at the beginning of each DRX cycle and the UE wakes up to decode possible scheduling of specific service. Each of these services can be scheduled anytime in the active time as per the DRX scheduling configuration. Basically, the UE decodes for the relevant G-RNTI (Group-Radio Network Temporary Identifier) for the DCI (Downlink Control Information) scheduling the PDSCH allocation for the specific service. Each SC-PTM service has a dedicated G-RNTI and the UE interested to receive a specific service will decode for relevant G-RNTI. Inactivity timer guides the UE to be awake for a stipulated time period and if no allocation is scheduled for the UE, the UE can undertake sleep.

Notably, the DRX retransmission timer may be newly needed in the New Radio (NR) MBS to track the possible retransmission of the downlink allocation. For example, in the NR when a specific service or the UE requires reliability, retransmission can be applied. In effect, when one or more of these timers are running, the UE will be in active time and undertakes decoding and reception of the relevant PTM service(s).

The DRX timers as per the DRX configurations also help the UE to achieve power saving by sleeping the UE that is not supposed to be in active time for the specified service.

However, there is excessive signaling overhead for DRX scheduling for multicast/broadcast service in legacy LTE SC-PTM due to per service DRX configuration is provided in signaling. With large number of services, the resultant signaling message is quite large. Moreover, to update/delete/add and/or compare to determine any change in configuration parameter is complex and difficult operation. Further grouping of the services which have same DRX scheduling configurations is also cumbersome.

Power consumption is also increased as an UE which is actively receiving multicast/broadcast service is required to access and decode MCCH message every modification window. With the advent of low latency services, e.g. V2X (Vehicle-to-anything communication) services, MCCH modification period is reduced to quite smaller values to dynamically reflect the change in configurations.

Thus, it is desired to address the above mentioned disadvantages or other shortcomings or at least provide a useful alternative.

SUMMARY

At least one object of the embodiment herein is to provide a method for DRX scheduling for multicast services in a 5G wireless network.

Another object of the embodiments herein is to handle a MCCH (MBS Control Channel) acquisition in the 5G wireless network.

Another object of the embodiments herein is to handle the DRX scheduling for the MBS in the 5G network by determining a limited set of DRX configurations and a list of MBS configurations supported by a gNodeB.

Another object of the embodiments herein is to handle the DRX scheduling for the MBS in the 5G network based on a MCCH message.

Another object of the embodiments herein is to handle the DRX scheduling for the MBS in the 5G network based on a system information message.

Another object of the embodiments herein is to handle the DRX scheduling for the MBS in the 5G network based on a size of the MCCH message.

Another object of the embodiments herein is to handle the DRX scheduling for the MBS in the 5G network based on a service information and an index of a list of DRX configurations corresponding to a plurality of MBS.

Accordingly, embodiments herein disclose a method for MCCH acquisition in a 5G wireless network. The method includes receiving, by the UE, a MCCH change notification from the gNodeB over a Physical Downlink Control Channel (PDCCH), where the MCCH change notification comprising includes first bit indicating a start of a new MBS session and a second bit indicating modification to a MBS session configuration of the ongoing MBS session. Further, the method includes detecting, by the UE, whether at least one of the UE is interested to receive a new MBS and UE is already receiving a MBS. Further, the method includes performing, by the UE, at least one of determining the start of the new MBS session for the new MBS by reading the first bit of the MCCH change notification in response to detecting that the UE is interested to receive the new MBS, and determining the modification to the MBS session configuration of the ongoing MBS session by reading the second bit of the MCCH change notification in response to detecting that the UE is already receiving the MBS.

In an embodiment, further, the method includes reading, by the UE, a MCCH message using at least one beam from a plurality of beams used for MCCH transmission based on one of the start of the new MBS session for the new MBS and the modification to the MBS session configuration of the ongoing MBS session.

In an embodiment, further, the method includes skipping, by the UE, reading of a MCCH message in a modification period in response to determining at least one of that the UE is not interested to receive the new MBS, the UE is interested to receive the new MBS but no indication for start of a new session is provided, and at least one of the UE is not receiving an ongoing MBS session, and the UE is receiving an ongoing MBS session but there is no indication for modification to the MBS session configuration of the ongoing MBS session is provided.

In an embodiment, receiving, by the UE, the MCCH change notification from the gNodeB over the PDCCH includes reading, by the UE, the MCCH change notification through a Downlink Control Information (DCI) in at least one of a first sub-frame, a first slot and first monitoring occasion of the MCCH modification and/or repetition period.

In an embodiment, the second bit also includes at least one of an indication for neighbour cell information change, an indication for a stop of an ongoing MBS session, and an indication for change of MCCH except start of a new session.

In an embodiment, the method includes determining, by the UE, the neighbour cell information change by reading the second bit of the MCCH change notification including the neighbour cell information change.

In an embodiment, the MCCH change notification includes a third bit indicating a neighbour cell information change.

In an embodiment, the method includes determining, by the UE, the neighbour cell information change by reading the third bit of the MCCH change notification including the neighbour cell information change.

In an embodiment, the method includes determining, by the UE, whether a time period to read the neighbour cell information is met or a threshold to read the neighbour cell information is met. Further, the method includes reading, by the UE, the MCCH to obtain neighbour cell information in response to determining that the time period to read the neighbour cell information is met or the threshold to read the neighbour cell information is met.

Accordingly, embodiments herein disclose a method for MCCH acquisition in a 5G wireless network. The method includes establishing, by a gNodeB, a MBS session. Further, the method includes modifying, by the gNodeB, an MBS session configuration of the ongoing MBS session, where the modification to the MBS session includes change in MCCH contents. Further, the method includes creating, by the gNodeB, a MCCH change notification includes a first bit indicating start of a new MBS session and a second bit indicating the modification to the MBS session configuration of the ongoing MBS session. Further, the method includes transmitting, by the gNodeB, the MCCH change notification to the UE over a Physical Downlink Control Channel (PDCCH).

In an embodiment, the MCCH change notification is transmitted to the UE over at least one of a PDCCH that schedules the MCCH, and a PDCCH that is different from PDCCH scheduling MCCH and uses a separate RNTI than that for PDCCH that schedules the MCCH.

In an embodiment, the MCCH change notification is transmitted to the UE through a DCI in at least one of a first sub-frame, a first slot and first monitoring occasion of the MCCH modification and/or repetition period.

In an embodiment, the MCCH change notification includes a third bit indicating a neighbour cell information change.

In an embodiment, the method includes configuring, by the gNodeB, at least one of a time period and a threshold to read the neighbour cell information for the UE.

Accordingly, embodiments herein disclose a UE for MCCH acquisition in a 5G wireless network. The UE includes a MCCH acquisition controller communicatively connected to a memory and a processor. The MCCH acquisition controller is configured to receive a MCCH change notification from the gNodeB over a PDCCH, wherein the MCCH change notification includes a first bit indicating a start of a new MBS session and a second bit indicating modification to a MBS session configuration of the ongoing MBS session. Further, the MCCH acquisition controller is configured to detect whether at least one of the UE is interested to receive a new MBS and already receiving a MBS. Further, the MCCH acquisition controller is configured to perform at least one of determine the start of the new MBS session for the new MBS by reading the first bit of the MCCH change notification in response to detecting that the UE is interested to receive the new MBS, and determine the modification to the MBS session configuration of the ongoing MBS session by reading the second bit of the MCCH change notification in response to detecting that the UE is already receiving the MBS.

Accordingly, embodiments herein disclose a gNodeB for MCCH acquisition in a 5G wireless network. The gNodeB includes a MCCH acquisition controller communicatively connected to a memory and a processor. The MCCH acquisition controller is configured to establish a MBS session with a UE. Further, the MCCH acquisition controller is configured to modify an MBS session configuration of the ongoing MBS session, where the modification to the MBS session includes change in MCCH contents. Further, the MCCH acquisition controller is configured to create a MCCH change notification including a first bit indicating start of a new MBS session and a second bit indicating the modification to the MBS session configuration of the ongoing MBS session. Further, the MCCH acquisition controller is configured to transmit the MCCH change notification to the UE over a PDCCH.

Accordingly, embodiments herein disclose a method for DRX scheduling for MBS in a 5G network. The method includes determining, by a gNodeB, a limited set of DRX configurations and a list of MBS configurations supported by the gNodeB. Further, the method includes mapping, by the gNodeB, an index to the limited set of DRX configurations and the list of MBS configurations. Further, the method includes sending, by the gNodeB, a MCCH message to the UE, wherein the MCCH message includes the limited set of DRX configurations, the list of MBS configurations and the index comprising the mapping to the limited set of DRX configurations for each MBS configuration from the list of MBS configurations.

In an embodiment, the list of limited set of DRX configurations and the list of MBS configurations supported by the gNodeB is determined based on latency requirements and reliability requirements of the gNodeB.

In an embodiment, each DRX configuration of the list of DRX configurations includes at least one of a DRX cycle length, a DRX short cycle, a DRX long cycle, an on-duration timer, an inactivity timer, a Retransmission (ReTx) timer, a Round-trip time (RTT) timer, a HARQ feedback configuration and a HARQ retransmission configuration.

In an embodiment, the method includes determining, by the gNodeB, a set of MBS from a plurality of MBS having a common DRX configuration. Further, the method includes grouping, by the gNodeB, the set of MBS corresponding to the common DRX configuration. Further, the method includes scheduling, by the gNodeB, the set of grouped MBS jointly for the UE based on the common DRX configuration.

Accordingly, embodiments herein disclose a method for DRX scheduling for MBS in a 5G network. The method includes receiving, by a UE, a MCCH message from the gNodeB. The MCCH message includes a limited set of DRX configurations and a list of MBS configurations supported by the gNodeB and an index comprising a mapping to the limited set of DRX configurations for each MBS configuration from the list of MBS configurations. The method includes configuring, by the UE, a lower layer based on the index corresponding to limited set of DRX configurations supported by the gNodeB and the service information of the MBS configuration.

In an embodiment, each DRX configuration of the limited set of DRX configurations includes at least one of a DRX cycle length, a DRX short cycle, a DRX long cycle, an on-duration timer, an inactivity timer, a ReTx timer, a Round-trip time (RTT) timer, a HARQ feedback configuration and a HARQ retransmission configuration.

In an embodiment, the method includes receiving, by the UE, a set of grouped MBS jointly based on a common DRX configuration scheduled from the gNodeB.

gNodeB for DRX scheduling for MBS in a 5G network. The gNodeB includes a DRX scheduling controller connected to a memory and a processor. The DRX scheduling controller is configured to determine a limited set of DRX configurations and a list of MBS configurations supported by the gNodeB. Further, the DRX scheduling controller is configured to map an index to the limited set of DRX configurations and the list of MBS configurations. The DRX scheduling controller is configured to send a MCCH message to the UE, where the MCCH message includes the limited set of DRX configurations, the MBS configurations and the index comprising the mapping to the limited set of DRX configurations for each of MBS configuration from the list of MBS configurations.

Accordingly, embodiments herein disclose a UE for DRX scheduling for MBS in a 5G network. The UE includes a DRX scheduling controller connected to a memory and a processor. The DRX scheduling controller is configured to receive a MCCH message from the gNodeB, where the MCCH message includes a limited set of DRX configurations and a list of MBS configurations supported by the gNodeB, and an index comprising a mapping to the limited set of DRX configurations for each of MBS configuration. Further, the DRX scheduling controller configures a lower layer based on the index corresponding to limited set of DRX configurations supported by the gNodeB and the MBS configurations.

Accordingly, embodiments herein disclose a method for DRX scheduling for MBS in a 5G network. The method includes broadcasting, by a gNodeB, a system information message to a UE, where the system information includes a list of DRX configurations corresponding to a plurality of MBS. Further, the method includes sending, by the gNodeB, a MCCH message comprising only an index corresponding to the list of DRX configurations to the UE to reduce size of the MCCH message.

In an embodiment, each DRX configuration of the list of DRX configurations includes at least one of a DRX cycle length, a DRX short cycle, a DRX long cycle, an on-duration timer, an inactivity timer, a ReTx timer, a RTT timer, a HARQ feedback configuration and a HARQ retransmission configuration.

In an embodiment, the method includes determining, by the gNodeB, a set of MBS from the plurality of MBS having a common DRX configuration. Further, the method includes grouping, by the gNodeB, the set of MBS corresponding to the common DRX configuration. Further, the method includes scheduling, by the gNodeB, the set of grouped MBS jointly for the UE based on the common DRX configuration.

Accordingly, embodiments herein disclose a method for DRX scheduling for MBS in a 5G network. The method includes receiving, by a UE, a system information message broadcasted by a gNodeB, where the system information includes a list of DRX configurations corresponding to a plurality of MBS. Further, the method includes receiving, by the UE, a MCCH message from the gNodeB, where the MCCH message includes only an index corresponding to the list of DRX configurations for each of MBS configuration from the gNodeB to reduce size of the MCCH message. Further, the method includes configuring, by the UE, a lower layer based on the index corresponding to the list of DRX configurations.

In an embodiment, each DRX configuration of the list of DRX configurations includes at least one of a DRX cycle length, a DRX short cycle, a DRX long cycle, an on-duration timer, an inactivity timer, a ReTx timer, a RTT timer, a HARQ feedback configuration and a HARQ retransmission configuration.

In an embodiment, the method includes receiving, by the UE, a set of grouped MBS jointly based on a common DRX configuration scheduled from the gNodeB.

Accordingly, embodiments herein disclose a gNodeB for DRX scheduling for MBS in a 5G network. The gNodeB includes a DRX scheduling controller connected to a memory and a processor. The DRX scheduling controller is configured to broadcast a system information message to a UE, where the system information includes a list of DRX configurations corresponding to a plurality of MBS. Further, the DRX scheduling controller is configured to send a MCCH message to the UE, where the MCCH message comprises only an index corresponding to the list of DRX configurations for each of the MBS configuration included to reduce size of the MCCH message.

Accordingly, embodiments herein disclose a UE for DRX scheduling for MBS in a 5G network. The UE includes a DRX scheduling controller connected to a memory and a processor. The DRX scheduling controller is configured to receive a system information message broadcasted by a gNodeB, where the system information includes a list of DRX configurations corresponding to a plurality of MBS. The DRX scheduling controller is configured to receive a MCCH message from the gNodeB, where the MCCH message includes only an index corresponding to the list of DRX configurations for each of MBS configuration to reduce size of the MCCH message. The DRX scheduling controller configures a lower layer based on the index corresponding to the list of DRX configurations.

Accordingly, embodiments herein disclose a method for DRX scheduling for MBS in a 5G network. The method includes detecting, by a gNodeB, a size of the MCCH message meets a MCCH size threshold, where the MCCH message includes at least one of a plurality of DRX configurations corresponding to a plurality of MBS, configurations for the plurality of MBS and neighbor cell information for the plurality of MBS services. Further, the method includes segmenting, by the gNodeB, the MCCH message into a plurality of segments to reduce size of the MCCH message at least one of a RRC layer, a RLC layer and a physical layer of the gNodeB. Further, the method includes individually sending, by the gNodeB, each segment of the MCCH message to reduce a size of each MCCH message.

In an embodiment, each DRX configuration of the list of DRX configurations includes at least one of a DRX cycle length, a DRX short cycle, a DRX long cycle, an on-duration timer, an inactivity timer, a ReTx timer, a Round-trip time (RTT) timer, a HARQ feedback configuration and a HARQ retransmission configuration.

In an embodiment, the method includes determining, by the gNodeB, a set of MBS from the plurality of MBS having a common DRX configuration. Further, the method includes grouping, by the gNodeB, the set of MBS corresponding to the common DRX configuration. Further, the method includes scheduling, by the gNodeB, the set of grouped MBS jointly for the UE based on the common DRX configuration.

Accordingly, embodiments herein disclose a method for DRX scheduling for MBS in a 5G network. The method includes configuring, by the UE, a lower layer of the UE to receive a plurality of segments of a MCCH message, where the lower layer is at least one of a RRC layer, a RLC layer and a physical layer. Further, the method includes individually receiving, by the UE, a plurality of segments of the MCCH message to reduce a size of each MCCH message, where the MCCH message includes a plurality of DRX configurations corresponding to a plurality of MBS, configurations for the plurality of MBS and neighbor cell information for the plurality of MBS services.

In an embodiment, each DRX configuration of the list of DRX configurations comprises at least one of a DRX cycle length, a DRX short cycle, a DRX long cycle, an on-duration timer, an inactivity timer, a ReTx timer, a RTT timer, a HARQ feedback configuration and a HARQ retransmission configuration.

In an embodiment, the method includes receiving, by the UE, a set of grouped MBS jointly based on a common DRX configuration scheduled from the gNodeB.

Accordingly, embodiments herein disclose a gNodeB for DRX scheduling for MBS in a 5G network. The gNodeB includes a DRX scheduling controller connected to a memory and a processor. The DRX scheduling controller is configured to detect a size of the MCCH message meets a MCCH size threshold, where the MCCH message includes a plurality of DRX configurations corresponding to a plurality of MBS, configurations for the plurality of MBS and neighbor cell information for the plurality of MBS services. The DRX scheduling controller is configured to segment the MCCH message into a plurality of segments to reduce size of the MCCH message at least one of a RRC layer, a RLC layer and a physical layer of the gNodeB. The DRX scheduling controller is configured to individually send each segment of the MCCH message to reduce a size of each MCCH message.

Accordingly, embodiments herein disclose a UE for DRX scheduling for MBS in a 5G network. The UE includes a DRX scheduling controller connected to a memory and a processor. The DRX scheduling controller configures a lower layer of the UE to receive a plurality of segments of a MCCH message, where the lower layer comprises at least one of a RRC layer, a RLC layer and a physical layer. Further, the DRX scheduling controller is configured to individually receive each segment of the plurality of segments of the MCCH message to reduce a size of the MCCH message, wherein the MCCH message includes a plurality of DRX configurations corresponding to a plurality of MBS, configurations for the plurality of MBS and neighbor cell information for the plurality of MBS services.

Accordingly, embodiments herein disclose a method for DRX scheduling for MBS in a 5G network. The method includes receiving, by a UE, service information and an index of a list of DRX configurations corresponding to a plurality of MBS. Further, the method includes mapping, by the UE, DRX configuration parameters defined at the network based on the service information and the index of the list of DRX configurations. Further, the method includes configuring, by the UE, a lower layer based on the index corresponding to the list of DRX configurations.

In an embodiment, each DRX configuration of the list of DRX configurations comprises at least one of a DRX cycle length, a DRX short cycle, a DRX long cycle, an on-duration timer, an inactivity timer, a ReTx timer, a RTT timer, a HARQ feedback configuration and a HARQ retransmission configuration.

In an embodiment, the method includes scheduling, by the UE, a set of grouped MBS jointly based on a common DRX configuration received from the gNodeB.

Accordingly, embodiments herein disclose a UE for DRX scheduling for MBS in a 5G network. The UE includes a DRX scheduling controller connected to a memory and a processor. The DRX scheduling controller is configured to receive service information and an index of a list of DRX configurations corresponding to a plurality of MBS. Further, the DRX scheduling controller is configured to map DRX configuration parameters defined at the network based on the service information and the index of the list of DRX configurations. Further, the DRX scheduling controller configures a lower layer based on the index corresponding to the list of DRX configurations.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF THE DRAWINGS

The embodiments are illustrated in the accompanying drawings, throughout which like reference letters indicate corresponding parts in the various figures. The embodiments herein will be better understood from the following description with reference to the drawings, in which.

DETAILED DESCRIPTION

Figure 1:
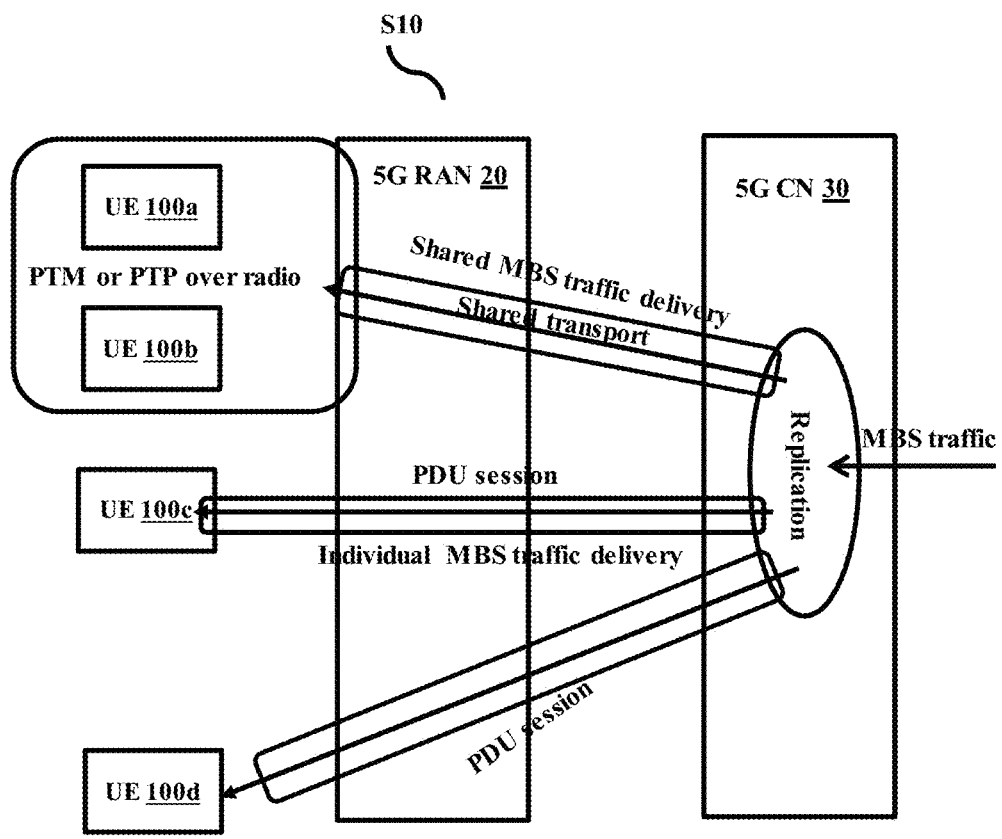
FIG. 1 and FIG. 2 illustrates multicast and broadcast services over existing NR framework, according to prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein disclose a method for MCCH acquisition in a 5G wireless network. The method includes receiving, by the UE, a MCCH change notification from the gNodeB over a PDCCH, where the MCCH change notification comprising a first bit indicating a start of a new MBS session and a second bit indicating modification to a MBS session configuration of the ongoing MBS session. Further, the method includes detecting, by the UE, whether at least one of the UE is interested to receive a new MBS and UE is already receiving a MBS. Further, the method includes performing, by the UE, at least one of determining the start of the new MBS session for the new MBS by reading the first bit of the MCCH change notification in response to detecting that the UE is interested to receive the new MBS, and determining the modification to the MBS session configuration of the ongoing MBS session by reading the second bit of the MCCH change notification in response to detecting that the UE is already receiving the MBS.

Unlike conventional methods, the proposed method is to efficiently signal multicast/broadcast DRX scheduling configurations for the Point to Multipoint (PTM) services to the UEs as well as method to achieve reduced power consumption by efficient notification mechanism about the MCCH change. Effectively, the UE is not required to read MCCH every modification period.

In the proposed method, signaling can be done more effectively with an overall list of DRX scheduling configurations in the beginning of the MCCH message or through broadcast System Information and an index to this list is indicated for each service configuration. Effectively, it provides a mapping of the DRX scheduling configuration and a PTM service. It is not excluded to have more than one index for a service i.e. apart from one to one mapping, one to many or many to one mapping is also possible in the approach. Further, multiple services having common DRX scheduling configurations can be grouped together, which facilitates the operations for the UE as well as reduce the signaling message size.

In the proposed method, the DRX scheduling configuration information is provided as list of DRX scheduling where each one has pertinent one or more PTM services. This is specifying a possibility where multiple multicast/broadcast services share a common DRX scheduling configuration. Also the UE which is capable of receiving more than one multicast/broadcast services together can as well receive these services together and effectively, save on power consumption. Possibly, network may schedule certain services disjoint with different DRX scheduling configurations so as to enable UEs to receive these services even if capability of the UE is limited in terms of receiving more services simultaneously.

In the proposed method, a list of PTM services whereas each one has one or more DRX scheduling configurations. In this case reception opportunities would be the union of the one or more DRX scheduling configurations for the specific PTM service.

In the proposed method, an exhaustive, pre-defined list is provided in specification and need not be transmitted. This will consist of all possible combinations of the DRX scheduling parameters i.e. different values of DRX timers organized in a table and an index to the table entry refers to a specific combination of these DRX timers. It is also feasible to define sub-set(s) of this list considering different deployments may possibly use sub-set(s) of the list and not the complete exhaustive list.

In the proposed method, it is easy to group services with using common indices for services with same scheduling/DRX pattern. Parsing of MCCH Scheduling Information, MCCH and scheduling/DRX implementation complexity is reduced for UE. Overall size of the MCCH Scheduling Information and MCCH can be effectively reduced.

In the proposed method, it can be noticed that change/addition/deletion of scheduling/DRX configuration or MBMS service in the MCCH message in the proposed approach is also easy and manageable. As compared to legacy where each service configuration parameter needs to be compared with earlier applied configurations parameters to determine if there is a change, now instead UE can just check for the change in index only.

In the proposed method, power saving aspect is targeted due to frequently decoding and accessing MCCH. MCCH can be scheduled more frequently to reflect dynamic changes, i.e. modification period in NR could be shorter than legacy LTE MCCH modification period ($5/10$ sec). In general, an UE, which is actively receiving a multicast service, is required to decode MCCH every modification period to access any updated information. However, with such fast scheduling, it leads to excessive power consumption when UE actually receive MCCH every modification period. Also, not all configurations are dynamic or impacting UE instantly. For example, neighbor cell information need not be read so frequently. To avoid frequent reading of MCCH, an additional bit in PDCCH notification representing "Change in SC-MCCH" is provided in an embodiment of the invention. This bit is different from the PDCCH notification of the legacy indicating of "Start of new service" as in LTE MBMS. Effectively, with the proposed approach, UE which is actively receiving one or more PTM service(s) is not required to read MCCH every modification period. A new bit indicating "change in MCCH" is used in PDCCH notification to prior inform UE about MCCH modification in same modification period. Bit when set represents in change in MCCH, otherwise no change in MCCH.

In the proposed method, power saving aspect is targeted due to frequently monitoring of MCCH change notification. Change in MCCH can be indicated through a DCI on the at least one of first sub-frame of the on-duration time for the active service. This way the UE doesn't need to monitor the specific sub-frame for MCCH change notification and disrupt its power saving cycle.

In the proposed method, power saving aspect is targeted due to frequently monitoring of MCCH change notification. Change in MCCH can be indicated through MAC-CE on the at least one of first sub-frame and first slot of the on-duration time for the active service. This way an UE doesn't need to monitor the specific sub-frame for MCCH change notification and disrupt its power saving cycle.

In the proposed method, if UE is not able to decode MBMS data for long or for a period greater than one MCCH modification period and/or could not decode MCCH change notification in the modification window, then it must update MCCH in next MCCH repetition or modification boundary or in the next MCCH scheduling instance.

In the proposed method, active UEs can follow the proposed scheme as mentioned in above embodiment and the non-active UEs can follow legacy method i.e. to decode MCCH Change notification as per the scheduling info shared by network.

In the proposed method, Change notification in PDCCH as was in legacy i.e. PDCCH DCI indicating "start of a new service" is also indicated with new approach of DCI or MAC CE in the at least one of first sub-frame and first slot of the On-duration time of the active service.

In the proposed method, the UE monitoring MCCH change notifications by any of the approaches mentioned earlier, will not monitor for MCCH change notification again in the same modifications window. For example, if UE reads MCCH change notification by DCI or MAC CE in the at least one of first sub-frame and first slot of the on duration timer of a specific service will not read it again in the DCI or MAC CE in the On-duration time of another service it is receiving in the same MCCH modification window.

In the proposed approach, the MCCH is transmitted to the UE by the gNB by adapting the at least one of MCCH transmission resources, MBS BWP/CFR and/or Initial BWP in accordance with the resources needed for MCCH transmission. The UE is configured/reconfigured accordingly. UE receives the MCCH with applying the relevant configuration for the MCCH transmission resources.

In the proposed approach, the UE utilizes the previously received MCCH in case of at least one of failure to decode of MCCH, loss of MCCH (e.g. due to multi-SIM based gap for network switching), loss of coverage, loss of synchronization. In another approach, when decoding or reception fails for MCCH in a repetition occasion, the UE attempts to decode and receives MCCH in the next repetition occasion of the modification period or the earliest repetition occasion possible. In another embodiment, the UE applies the previously received or stored MCCH until it can successfully decode and receive MCCH again.

In the proposed approach, UE skips decoding and receiving the MCCH even when there is a change in neighbor cell information change but no modification of session configuration is indicated based on the one of thresholds pertaining to at least one of UE mobility, signal strength measurements, UE location etc. The thresholds are configured by network and/or determined by the UE itself.

The method can be used to provide for multiple resource efficient approaches for MCCH transmission and reduce the power consumption with lesser segmentation. The method provides an optimized signaling message (e.g., DRX-service mapping, RRC segmentation approach, BWP adaptation, or the like).

Referring now to the drawings, and more particularly to FIGS. 4 through 26, there are shown preferred embodiments.

Figure 2:
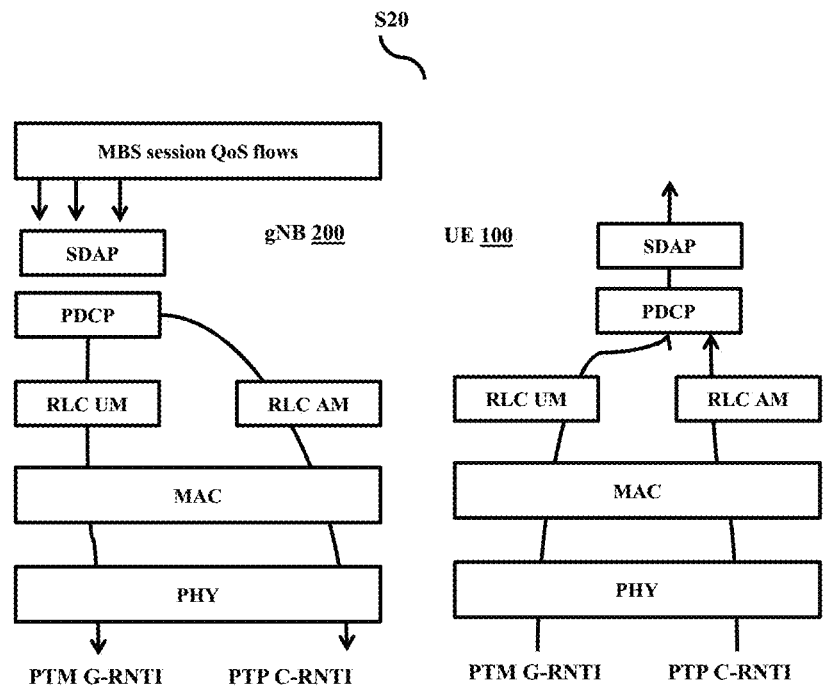

FIG. 1 and FIG. 2 illustrates (S10 and S20) a multicast and broadcast services over existing NR framework, according to prior art. As shown in FIG. 1, in the 5G wireless communication system (S10), Core Network (CN) (30) can deliver MBS user data to the Radio Access Network (RAN) (20) using following delivery methods:

Individual delivery: for each individual UE (100c and 100d) receiving the MBS service, CN delivers separate copies of the MBS user data packets to RAN (i.e. via per-UE PDU sessions, alike in case of unicast delivery)

Shared delivery: The CN (30) delivers a single copy of MBS user data to RAN (20) i.e. via a shared PDU session/tunnel), with RAN (20) handling delivery to one or multiple UEs (100a, 100b) In case of shared delivery by CN (30), RAN (20) delivers MBS data to UEs (100a, 100b) using either Point-to-Point delivery (PTP) or Point-to-Multipoint (PTM) delivery.

Furthermore, NR MBS protocol architecture (S20) as illustrated in FIG. 2, at the UE (100), reception via an MBS radio bearer (MRB) from the gNB (200) can be supported using:
1. a single/common SDAP entity
2. a single/common PDCP entity
3. A single PTM RLC bearer, a single PTP RLC bearer or a combination i.e. UE simultaneously configured with a PTM and a PTP RLC bearer (also referred to as PTM and PTP legs)

Figure 3:
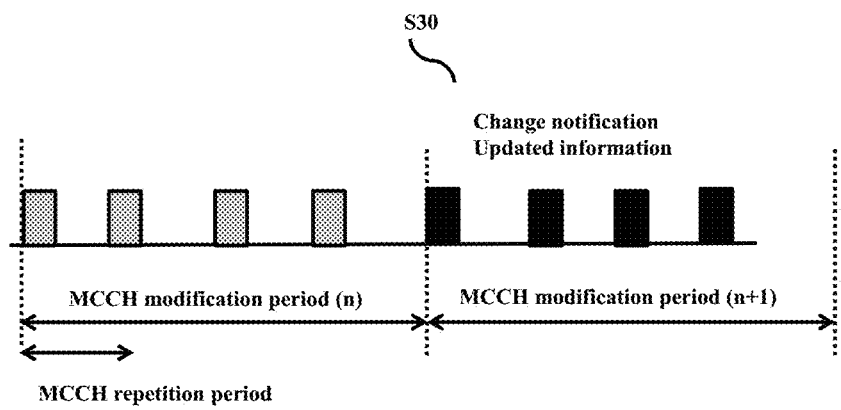
FIG. 3 illustrates a power consumption issue at a UE, while decoding MCCH at every modification period, according to prior art.

More specifically, a UE (100) can be configured with:
a) A PTM RLC bearer only
b) A PTP RLC bearer only, either using RLC Unacknowledged Mode (UM) or RLC Acknowledged Mode (AM)
c) A split RLC bearer i.e. both a PTM and PTP RLC bearer, both using RLC UM
d) A split RLC bearer i.e. both a PTM and PTP RLC bearer, using RLC UM and RLC AM respectively The 3GPP is working on NR MBS work item, a late entrant to Rel17, which is targeted to enable multicast and broadcast services over existing NR framework. In the NR framework, two delivery modes (e.g., DM1 and DM2) are targeted for high reliability/low latency services and low reliability services respectively. Further, the PTM and/or PTP bearers for delivery are targeted catering to different reliability of services and dynamically switching across. For DM2/PTM, control signaling follows hierarchical structure with SIB and MCCH channels. The MCCH carries control signaling, which has repetition and modification period based structure. Message includes MBS services configuration, DRX configuration and neighbor cell information for MBS services FIG. 3 illustrates (S30) a power consumption issue at the UE, while decoding MCCH at every modification period, according to prior art. As shown in the FIG. 3, in legacy, the MCCH is read at least once every Modification Period (MP) to determine change in MCCH contents. Further, there is no coordination with unicast active time such that MCCH and unicast DRX are scheduled dis-jointly and pattern may not overlap and the UE comes out of sleep to decode MCCH, and wakeup cause power consumption. Further, there are NR design related issues (such as MCCH is segmented (M segments) and beam-formed across time-domain (N beams) =>Possible M×N units spread in awake time, Excessive power consumption due to longer time span). Further, the decoding MCCH at every modification period is a processing overhead for the UE and leads to excessive power consumption.

In the existing methods, there is excessive signaling overhead for the DRX scheduling for multicast/broadcast service in legacy LTE SC-PTM due to per service DRX configuration is provided in signaling. With large number of services, the resultant signaling message is quite large. Moreover, to update/delete/add and/or compare to determine any change in configuration parameter is complex and difficult operation. Further grouping of the services which have same DRX scheduling configurations is also cumbersome.

One possible approach to schedule the multicast services is to provide per service DRX configuration parameters. This is the approach used in legacy, more specifically in LTE SC-PTM. UE can receive specific PTM service as per the DRX configuration provided. This implies certain specific configuration for DRX on-duration timer, inactivity timer and/or retransmission timer, DRX cycle length, start offset etc. are provided and UE can attempt to decode the service in accordance with the applicable active time for the specific PTM service. More specifically, these timers and parameters may be provided in units of milli-second or micro-second, TTIs, number of sub-frames/slots/symbols, number of downlink sub-frames/slots/symbols etc.

In general, it can be noticed with existing approach, the SC-PTM scheduling/DRX pattern signaling is redundantly repeated for each MBMS service leading to potentially bigger MCCH message size.

Further, signaling message for PTM service does not provide any flexibility to group services with common scheduling/DRX pattern. It is problematic to network which may desire to group some services with same PTM scheduling/DRX pattern and also to the UEs to interpret the grouping and efficiently implement DRX operation. Considering the number of MBMS services may be large and MCCH reading frequency being quite high with shorter MCCH modification/repetition periods, a lot of implementation complexity is posed.

Figure 4:
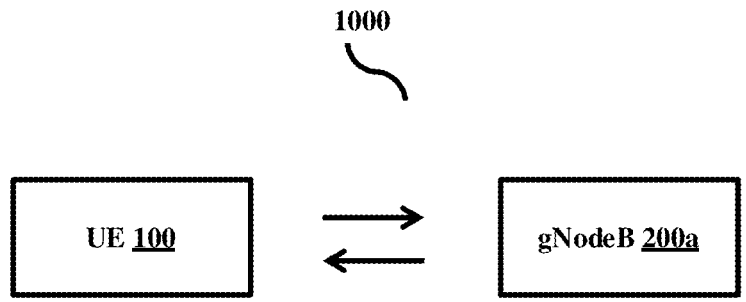
FIG. 4 is an overview of a 5G wireless network for handling DRX scheduling for a MBS, according to an embodiment as disclosed herein.

FIG. 4 is an overview of a 5G wireless network (1000) for handling DRX scheduling for the MBS, according to an embodiment as disclosed herein. In an embodiment, the wireless network (1000) includes a UE (100) and a gNodeB (200). The UE (100) can be, for example, but not limited to a laptop, a desktop computer, a notebook, a relay device, a Device-to-Device (D2D) device, a vehicle to everything (V2X) device, a smartphone, a tablet, an immersive device or the like.

The UE (100) is configured to establish a MBS session with the gNodeB (200). Further, the UE (100) is configured to receive a MCCH change notification from the gNodeB (200) over a PDCCH. In an embodiment, the MCCH change notification is received from the gNodeB (200) over the PDCCH by reading the MCCH change notification through a DCI in at least one of a first sub-frame, a first slot and first monitoring occasion of the MCCH modification and/or repetition period. The MCCH change notification includes a first bit indicating a start of a new MBS session and a second bit indicating modification to a MBS session configuration of the ongoing MBS session. Further, the UE (100) is configured to detect whether the UE (100) is interested to receive a new MBS and already receiving a MBS. If the UE (100) is interested to receive the new MBS, the UE (100) is configured to determine the start of the new MBS session for the new MBS by reading the first bit of the MCCH change notification. If the UE (100) is already receiving the MBS then, the UE (100) is configured to determine the modification to the MBS session configuration of the ongoing MBS session by reading the second bit of the MCCH change notification. The second bit also includes at least one of an indication for neighbour cell information change, an indication for a stop of an ongoing MBS session, and an indication for change of MCCH except start of a new session.

Further, the UE (100) is configured to read a MCCH message using one or more beam based on one of the start of the new MBS session for the new MBS and the modification to the MBS session configuration of the ongoing MBS session. Further, the UE (100) is configured to skip of a MCCH message in a modification period in response to determining that the UE (100) is not interested to receive the new MBS, the UE (100) is interested to receive the new MBS but no indication for start of a new session is provided, and the UE (100) is not receiving an ongoing MBS session, and the UE (100) is receiving an ongoing MBS session but there is no indication for modification to the MBS session configuration of the ongoing MBS session is provided.

Further, the UE (100) is configured to determine the neighbour cell information change by reading the second bit of the MCCH change notification including the neighbour cell information change.

In an embodiment, the MCCH change notification includes a third bit indicating a neighbour cell information change. The UE (100) is configured to determine the neighbour cell information change by reading the third bit of the MCCH change notification including the neighbour cell information change. Further, the UE (100) is configured to determine whether a time period to read the neighbour cell information is met or a threshold to read the neighbour cell information is met. The UE (100) is configured to read the MCCH to obtain the neighbour cell information in response to determining that the time period to read the neighbour cell information is met or the threshold to read the neighbour cell information is met.

In an embodiment, the UE (100) is configured to receive a MCCH message from the gNodeB (200). The MCCH message includes a limited set of DRX configurations and a list of MBS configurations supported by the gNodeB (200), and an index comprising a mapping to the limited set of DRX configurations for each of MBS configuration. Each DRX configuration of the limited set of DRX configurations includes a DRX cycle length, a DRX short cycle, a DRX long cycle, an on-duration timer, an inactivity timer, a ReTx timer, a RTT timer, a HARQ feedback configuration and a HARQ retransmission configuration. Further, the UE (100) configures a lower layer based on the index corresponding to limited set of DRX configurations supported by the gNodeB (200) and the MBS configurations. Further, the UE (100) is configured to schedule a set of grouped MBS jointly based on a common DRX configuration received from the gNodeB (200).

In an embodiment, the UE (100) is configured to receive a system information message broadcasted by the gNodeB (200). The system information includes a list of DRX configurations corresponding to the plurality of MBS. Each DRX configuration of the list of DRX configurations includes the DRX cycle length, the DRX short cycle, the DRX long cycle, the on-duration timer, the inactivity timer, the ReTx timer, the RTT timer, the HARQ feedback configuration and the HARQ retransmission configuration. Further, the UE (100) is configured to receive a MCCH message from the gNodeB (200). The MCCH message includes only an index corresponding to the list of DRX configurations for each of MBS configuration to reduce size of the MCCH message. The UE (100) configures the lower layer based on the index corresponding to the list of DRX configurations. Further, the UE (100) is configured to schedule the set of grouped MBS jointly based on a common DRX configuration received from the gNodeB (200).

In an embodiment, the UE (100) configures the lower layer of the UE (100) to receive a plurality of segments of a MCCH message. The lower layer can be, for example, but not limited to a RRC layer, a RLC layer and a physical layer. Further, the UE (100) is configured to individually receive each segment of the plurality of segments of the MCCH message to reduce a size of the MCCH message. The MCCH message includes a plurality of DRX configurations corresponding to a plurality of MBS, configurations for the plurality of MBS and neighbour cell information for the plurality of MBS services. Further, the UE (100) is configured to schedule a set of grouped MBS jointly based on the common DRX configuration received from the gNodeB (200).

In an embodiment, the UE (100) is configured to receive service information and the index of a list of DRX configurations corresponding to the plurality of MBS. Further, the UE (100) is configured to map DRX configuration parameters defined at the network (1000) based on the service information and the index of the list of DRX configurations. Further, the UE (100) configures the lower layer based on the index corresponding to the list of DRX configurations. Further, the UE (100) is configured to schedule the set of grouped MBS jointly based on the common DRX configuration received from the gNodeB (200).

In an embodiment, the gNodeB (200) is configured to establish the MBS session with the UE (100). Further, the gNodeB (200) is configured to modify the MBS session configuration of the ongoing MBS session. The modification to the MBS session includes change in MCCH contents. Further, the gNodeB (200) is configured to create the MCCH change notification including the first bit indicating start of the new MBS session and the second bit indicating the modification to the MBS session configuration of the ongoing MBS session. Further, the gNodeB (200) is configured to transmit the MCCH change notification to the UE (100) over the PDCCH.

In an embodiment, the MCCH change notification is transmitted to the UE (100) over the PDCCH that schedules the MCCH, and the PDCCH that is different from PDCCH scheduling MCCH and uses the separate RNTI than that for PDCCH that schedules the MCCH. The MCCH change notification is transmitted to the UE (100) through the DCI in the at least one of first sub-frame, the first slot and the first monitoring occasion of the MCCH modification and/or repetition period. Further, the MCCH change notification also includes a third bit indicating a neighbour cell information change. Further, the gNodeB (200) configures the time period and a threshold to read the neighbour cell information for the UE (100).

In an embodiment, the gNodeB (200) is configured to determine the limited set of DRX configurations and the list of MBS configurations supported by the gNodeB (200). Further, the gNodeB (200) is configured to map the index to the limited set of DRX configurations and the list of MBS configurations. Further, the gNodeB (200) is configured to send the MCCH message to the UE (100). The MCCH message includes the limited set of DRX configurations, the MBS configurations and the index comprising the mapping to the limited set of DRX configurations for each of MBS configuration from the list of MBS configurations.

In an embodiment, the gNodeB (200) is configured to determine the set of MBS from the plurality of MBS having the common DRX configuration. Further, the gNodeB (200) is configured to group the set of MBS corresponding to the common DRX configuration. Further, the gNodeB (200) is configured to schedule the set of grouped MBS jointly for the UE (100) based on the common DRX configuration.

In an embodiment, the gNodeB (200) is configured to broadcast the system information message to the UE (100). The system information includes the list of DRX configurations corresponding to the plurality of MBS. Further, the gNodeB (200) is configured to send the MCCH message to the UE (100). The MCCH message includes only the index corresponding to the list of DRX configurations for each of the MBS configuration included to reduce size of the MCCH message.

Further, the gNodeB (200) is configured to determine the set of MBS from the plurality of MBS having the common DRX configuration. Further, the gNodeB (200) is configured to group the set of MBS corresponding to the common DRX configuration. Further, the gNodeB (200) is configured to schedule the set of grouped MBS jointly for the UE (100) based on the common DRX configuration.

In an embodiment, the gNodeB (200) is configured to detect the size of the MCCH message meets the MCCH size threshold, where the MCCH message includes the plurality of DRX configurations corresponding to the plurality of MBS, configurations for the plurality of MBS and neighbour cell information for the plurality of MBS services. Further, the gNodeB (200) is configured to segment the MCCH message into the plurality of segments to reduce size of the MCCH message at least one of the RRC layer, the RLC layer and the physical layer of the gNodeB (200). Further, the gNodeB (200) is configured to individually send each segment of the MCCH message to reduce a size of each MCCH message.

Further, the gNodeB (200) is configured to detect the set of MBS from the plurality of MBS having the common DRX configuration. Further, the gNodeB (200) is configured to group the set of MBS corresponding to the common DRX configuration. Further, the gNodeB (200) is configured to schedule the set of grouped MBS jointly for the UE (100) based on the common DRX configuration.

Figure 5:
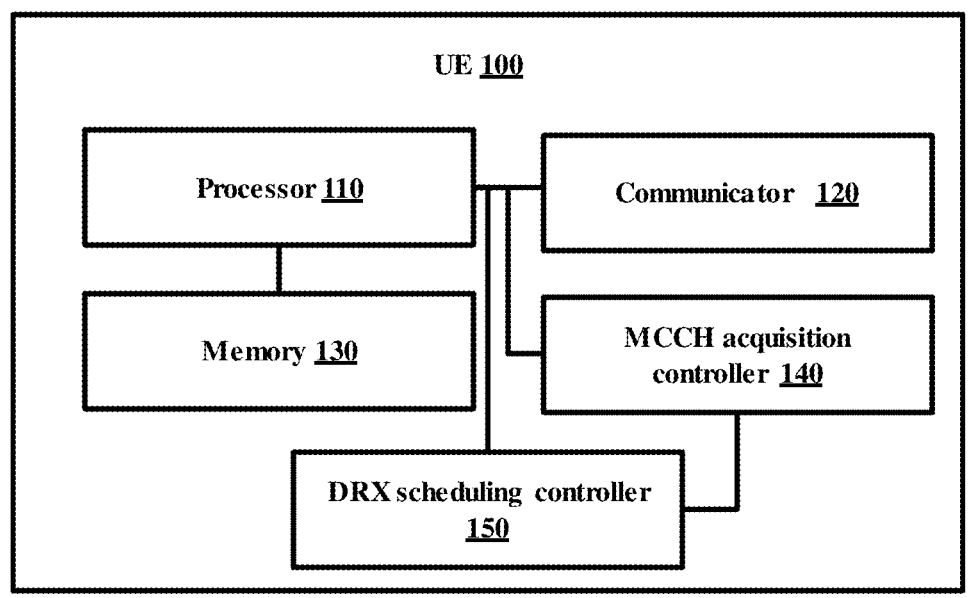
FIG. 5 shows various hardware components of the UE, according to an embodiment as disclosed herein.

FIG. 5 shows various hardware components of the UE (100), according to an embodiment as disclosed herein. In an embodiment, the UE (100) includes a processor (110), a communicator (120), a memory (130), a MCCH acquisition controller (140), and a DRX scheduling controller (150). The processor (110) is coupled with the communicator (120), the memory (130), the MCCH acquisition controller (140), and the DRX scheduling controller (150).

The MCCH acquisition controller (140) is configured to establish the MBS session with the gNodeB (200). Further, the MCCH acquisition controller (140) is configured to receive the MCCH change notification from the gNodeB (200) over the PDCCH. In an embodiment, the MCCH change notification is received from the gNodeB (200) over the PDCCH by reading the MCCH change notification through a DCI in the at least one of a first sub-frame, the first slot and the first monitoring occasion of the MCCH modification and/or repetition period. The MCCH change notification includes the first bit indicating the start of the new MBS session and the second bit indicating modification to the MBS session configuration of the ongoing MBS session. Further, the MCCH acquisition controller (140) is configured to detect whether the UE (100) is interested to receive the new MBS and already receiving a MBS. If the UE (100) is interested to receive the new MBS, the MCCH acquisition controller (140) is configured to determine the start of the new MBS session for the new MBS by reading the first bit of the MCCH change notification. If the UE (100) is already receiving the MBS then, the MCCH acquisition controller (140) is configured to determine the modification to the MBS session configuration of the ongoing MBS session by reading the second bit of the MCCH change notification. The second bit also includes at least one of the indication for neighbour cell information change, the indication for a stop of an ongoing MBS session, and the indication for change of MCCH except start of the new session.

Further, the MCCH acquisition controller (140) is configured to read the MCCH message using one or more beam based on one of the start of the new MBS session for the new MBS and the modification to the MBS session configuration of the ongoing MBS session.

Further, the MCCH acquisition controller (140) is configured to skip of the MCCH message in the modification period in response to determining that the UE (100) is not interested to receive the new MBS, the UE (100) is interested to receive the new MBS but no indication for start of a new session is provided, and the UE (100) is not receiving the ongoing MBS session, and the UE (100) is receiving the ongoing MBS session but there is no indication for modification to the MBS session configuration of the ongoing MBS session is provided.

Further, the MCCH acquisition controller (140) is configured to determine the neighbour cell information change by reading the second bit of the MCCH change notification including the neighbour cell information change.

In an embodiment, the MCCH change notification includes the third bit indicating a neighbour cell information change. The MCCH acquisition controller (140) is configured to determine the neighbour cell information change by reading the third bit of the MCCH change notification including the neighbour cell information change. Further, the MCCH acquisition controller (140) is configured to determine whether a time period to read the neighbour cell information is met or a threshold to read the neighbour cell information is met. The MCCH acquisition controller (140) is configured to read the MCCH to obtain the neighbour cell information in response to determining that the time period to read the neighbour cell information is met or the threshold to read the neighbour cell information is met.

In an embodiment, the DRX scheduling controller (150) is configured to receive the MCCH message from the gNodeB (200). The MCCH message includes the limited set of DRX configurations and a list of MBS configurations supported by the gNodeB (200), and an index comprising the mapping to the limited set of DRX configurations for each of MBS configuration. Further, the DRX scheduling controller (150) configures the lower layer based on the index corresponding to limited set of DRX configurations supported by the gNodeB (200) and the MBS configurations. Further, the DRX scheduling controller (150) is configured to schedule the set of grouped MBS jointly based on the common DRX configuration received from the gNodeB (200).

In an embodiment, the DRX scheduling controller (150) is configured to receive the system information message broadcasted by the gNodeB (200). The system information includes the list of DRX configurations corresponding to the plurality of MBS. Further, the DRX scheduling controller (150) is configured to receive the MCCH message from the gNodeB (200). The MCCH message includes only the index corresponding to the list of DRX configurations for each of MBS configuration to reduce size of the MCCH message. Further, the DRX scheduling controller (150) configures the lower layer based on the index corresponding to the list of DRX configurations. Further, the DRX scheduling controller (150) is configured to schedule the set of grouped MBS jointly based on the common DRX configuration received from the gNodeB (200).

In an embodiment, the DRX scheduling controller (150) is configured to configure the lower layer of the UE (100) to receive the plurality of segments of the MCCH message. The lower layer can be, for example, but not limited to the RRC layer, the RLC layer and the physical layer. Further, the DRX scheduling controller (150) is configured to individually receive each segment of the plurality of segments of the MCCH message to reduce the size of the MCCH message. The MCCH message includes the plurality of DRX configurations corresponding to a plurality of MBS, configurations for the plurality of MBS and neighbour cell information for the plurality of MBS services. Further, the DRX scheduling controller (150) is configured to schedule the set of grouped MBS jointly based on the common DRX configuration received from the gNodeB (200).

In an embodiment, the DRX scheduling controller (150) is configured to receive the service information and the index of the list of DRX configurations corresponding to the plurality of MBS. Further, the DRX scheduling controller (150) is configured to map DRX configuration parameters defined at the network (1000) based on the service information and the index of the list of DRX configurations. Further, the DRX scheduling controller (150) is configured to configure the lower layer based on the index corresponding to the list of DRX configurations. Further, the DRX scheduling controller (150) is configured to schedule a set of grouped MBS jointly based on a common DRX configuration received from the gNodeB (200).

The MCCH acquisition controller (140) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

The DRX scheduling controller (150) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Although the FIG. 5 shows various hardware components of the UE (100) but it is to be understood that other embodiments are not limited thereon. In other embodiments, the UE (100) may include less or more number of components. Further, the labels or names of the components are used only for illustrative purpose and does not limit the scope of the invention. One or more components can be combined together to perform same or substantially similar function in the UE (100).

Figure 6:
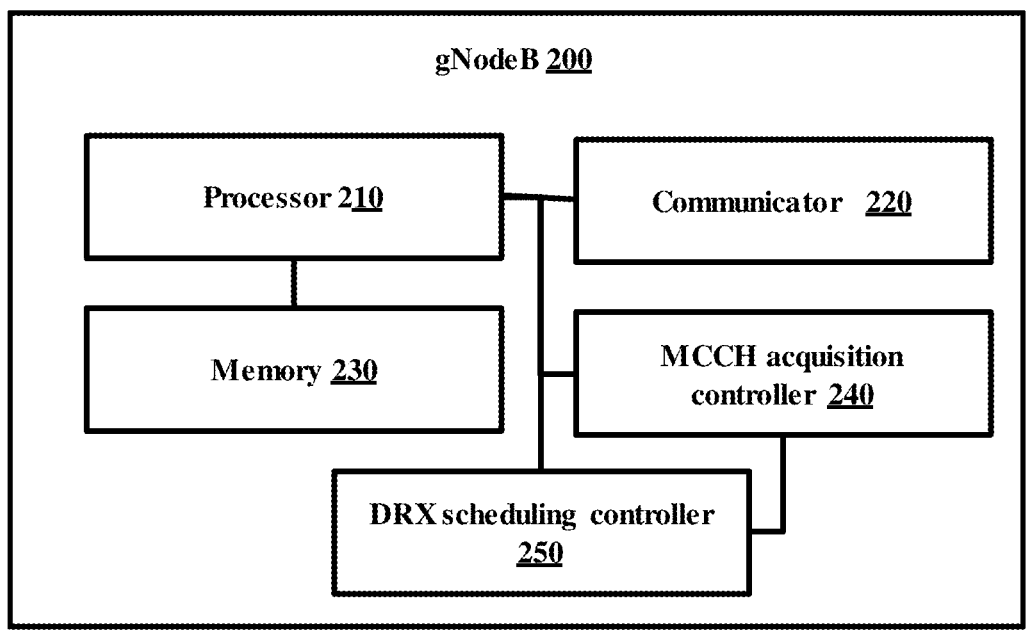
FIG. 6 shows various hardware components of a gNodeB, according to an embodiment as disclosed herein.

FIG. 6 shows various hardware components of a gNodeB (200), according to an embodiment as disclosed herein. In an embodiment, the gNodeB (200) includes a processor (210), a communicator (220), a memory (230), a MCCH acquisition controller (240), and a DRX scheduling controller (250). The processor (210) is coupled with the communicator (220), the memory (230), the MCCH acquisition controller (240), and the DRX scheduling controller (250).

In an embodiment, the MCCH acquisition controller (240) is configured to establish the MBS session with the UE (100). Further, the MCCH acquisition controller (240) is configured to modify the MBS session configuration of the ongoing MBS session. The modification to the MBS session includes change in MCCH contents. Further, the MCCH acquisition controller (240) is configured to create the MCCH change notification includes the first bit indicating start of the new MBS session and the second bit indicating the modification to the MBS session configuration of the ongoing MBS session. Further, the MCCH acquisition controller (240) is configured to transmit the MCCH change notification to the UE (100) over the PDCCH.

In an embodiment, the MCCH change notification is transmitted to the UE (100) the PDCCH that schedules the MCCH, and the PDCCH that is different from PDCCH scheduling MCCH and uses the separate RNTI than that for PDCCH that schedules the MCCH. The MCCH change notification is transmitted to the UE (100) through the DCI in at least one of the first sub-frame, the first slot and the first monitoring occasion of the MCCH modification and/or repetition period. Further, the MCCH change notification also comprises the third bit indicating the neighbour cell information change. Further, MCCH acquisition controller (240) configures the time period and the threshold to read the neighbour cell information for the UE (100).

In an embodiment, a DRX scheduling controller (250) is configured to determine the limited set of DRX configurations and the list of MBS configurations supported by the gNodeB (200). Further, the DRX scheduling controller (250) is configured to map the index to the limited set of DRX configurations and the list of MBS configurations. Further, the DRX scheduling controller (250) is configured to send the MCCH message to the UE (100). The MCCH message includes the limited set of DRX configurations, the MBS configurations and the index comprising the mapping to the limited set of DRX configurations for each of MBS configuration from the list of MBS configurations.

In an embodiment, the DRX scheduling controller (250) is configured to determine the set of MBS from the plurality of MBS having the common DRX configuration. Further, the DRX scheduling controller (250) is configured to group the set of MBS corresponding to the common DRX configuration. Further, the DRX scheduling controller (250) is configured to schedule the set of grouped MBS jointly for the UE (100) based on the common DRX configuration.

In an embodiment, the DRX scheduling controller (250) is configured to broadcast the system information message to the UE (100). The system information includes the list of DRX configurations corresponding to the plurality of MBS. Further, the DRX scheduling controller (250) is configured to send the MCCH message to the UE (100). The MCCH message includes only the index corresponding to the list of DRX configurations for each of the MBS configuration included to reduce size of the MCCH message.

Further, the DRX scheduling controller (250) is configured to determine the set of MBS from the plurality of MBS having the common DRX configuration. Further, the DRX scheduling controller (250) is configured to group the set of MBS corresponding to the common DRX configuration. Further, the DRX scheduling controller (250) is configured to schedule the set of grouped MBS jointly for the UE (100) based on the common DRX configuration.

In an embodiment, the DRX scheduling controller (250) is configured to detect the size of the MCCH message meeting a MCCH size threshold. The MCCH message includes the plurality of DRX configurations corresponding to the plurality of MBS, configurations for the plurality of MBS and neighbour cell information for the plurality of MBS services. Further, the DRX scheduling controller (250) is configured to segment the MCCH message into the plurality of segments to reduce size of the MCCH message at least one of the RRC layer, the RLC layer and the physical layer of the gNodeB (200). Further, the DRX scheduling controller (250) is configured to individually send each segment of the MCCH message to reduce a size of each MCCH message.

Further, the DRX scheduling controller (250) is configured to detect the set of MBS from the plurality of MBS having the common DRX configuration. Further, the DRX scheduling controller (250) is configured to group the set of MBS corresponding to the common DRX configuration.

Further, the DRX scheduling controller (250) is configured to schedule the set of grouped MBS jointly for the UE (100) based on the common DRX configuration.

The MCCH acquisition controller (240) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

The DRX scheduling controller (250) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Although the FIG. 6 shows various hardware components of the gNodeB (200) but it is to be understood that other embodiments are not limited thereon. In other embodiments, the gNodeB (200) may include less or more number of components. Further, the labels or names of the components are used only for illustrative purpose and does not limit the scope of the invention. One or more components can be combined together to perform same or substantially similar function in the gNodeB (200).

Figure 7:
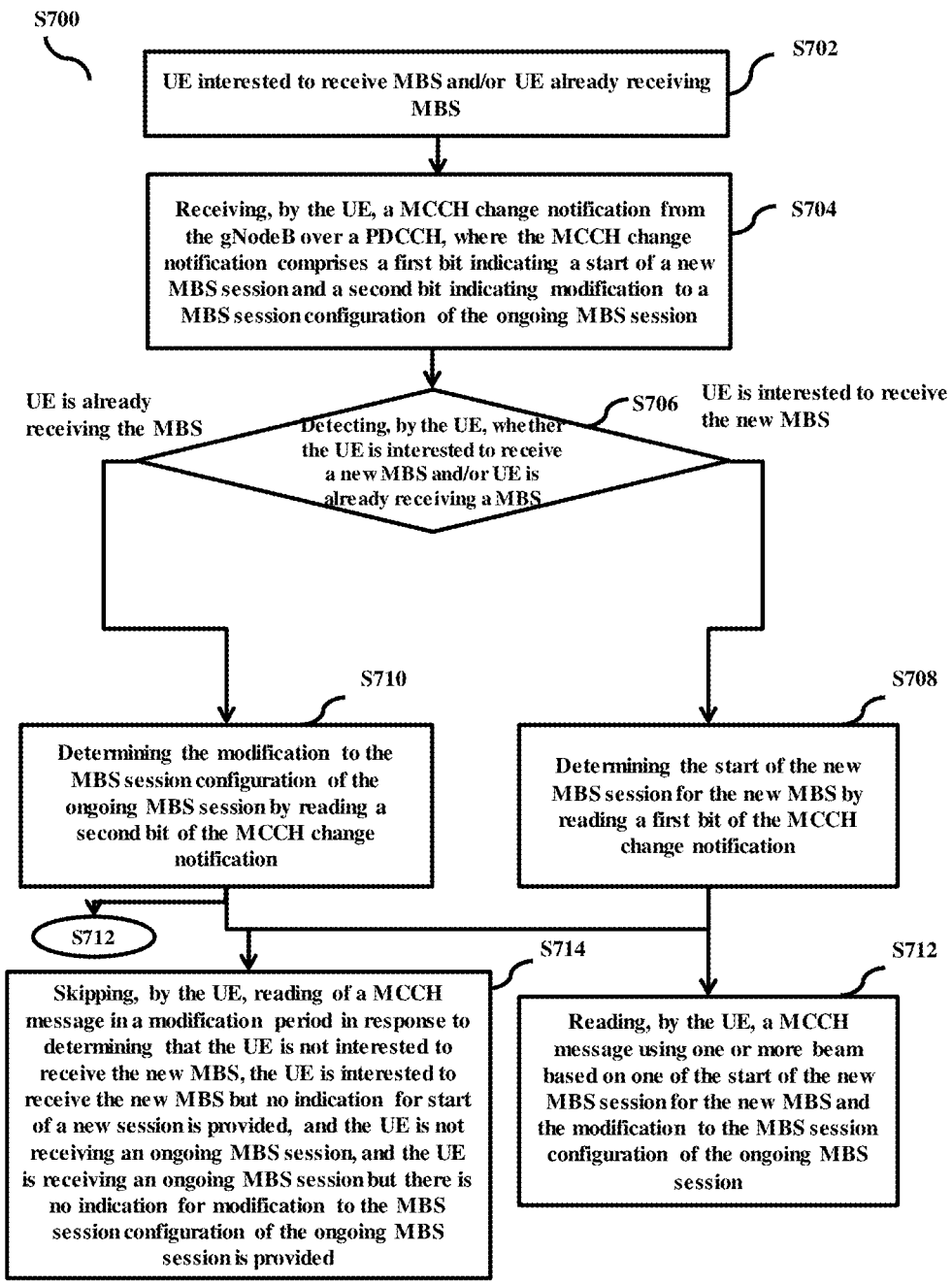
FIG. 7 is a flow chart illustrating a method for MCCH acquisition in the 5G wireless network, according to an embodiment as disclosed herein.

FIG. 7 is a flow chart (S700) illustrating a method for MCCH acquisition in the 5G wireless network (1000), according to an embodiment as disclosed herein. The operations (S702-S714) are handled by the MCCH acquisition controller (140).

At S702, the UE (100) is interested to receive MBS and/or the UE 0100 already receiving MBS. At S704, the method includes receiving the MCCH change notification from the gNodeB (200) over the PDCCH, where the MCCH change notification includes the first bit indicating the start of the new MBS session and the second bit indicating modification to the MBS session configuration of the ongoing MBS session. At S706, the method includes detecting whether the UE (100) is interested to receive the new MBS and/or the UE is already receiving the MBS.

If the UE (100) is interested to receive the new MBS then, at S708, the method includes determining the start of the new MBS session for the new MBS by reading the first bit of the MCCH change notification. If the UE (100) is already receiving the MBS, at S710, the method includes determining the modification to the MBS session configuration of the ongoing MBS session by reading the second bit of the MCCH change notification.

At S712, the method includes reading the MCCH message using one or more beam based on one of the start of the new MBS session for the new MBS and the modification to the MBS session configuration of the ongoing MBS session. At S714, the method includes skipping reading of the MCCH message in a modification period in response to determining that the UE (100) is not interested to receive the new MBS, the UE (100) is interested to receive the new MBS but no indication for start of a new session is provided, and the UE (100) is not receiving the ongoing MBS session, and the UE (100) is receiving the ongoing MBS session but there is no indication for modification to the MBS session configuration of the ongoing MBS session is provided.

Figure 8:
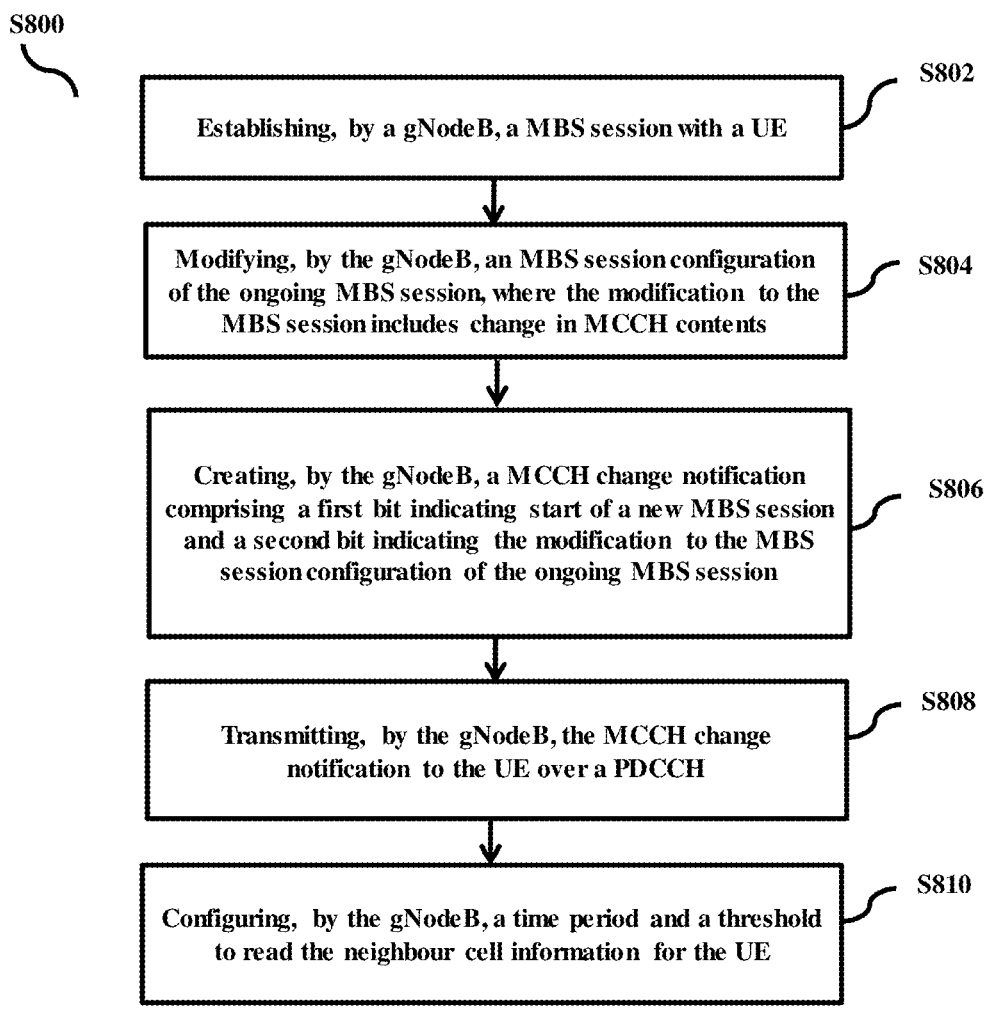
FIG. 8 is a flow chart illustrating a method, implemented by the gNodeB, for the MCCH acquisition in the 5G wireless network, according to an embodiment as disclosed herein.

FIG. 8 is a flow chart (S800) illustrating a method, implemented by the gNodeB (200), for the MCCH acquisition in the 5G wireless network (1000), according to an embodiment as disclosed herein. The operations (S802-S810) are handled by the MCCH acquisition controller (240).

At S802, the method includes establishing the MBS session with the UE (100). At S804, the method includes modifying the MBS session configuration of the ongoing MBS session, where the modification to the MBS session includes change in MCCH contents. At S806, the method includes creating the MCCH change notification comprising the first bit indicating start of a new MBS session and the second bit indicating the modification to the MBS session configuration of the ongoing MBS session. At S808, the method includes transmitting the MCCH change notification to the UE (100) over the PDCCH. At S810, the method includes configuring the time period and the threshold to read the neighbor cell information for the UE (100).

Figure 9:
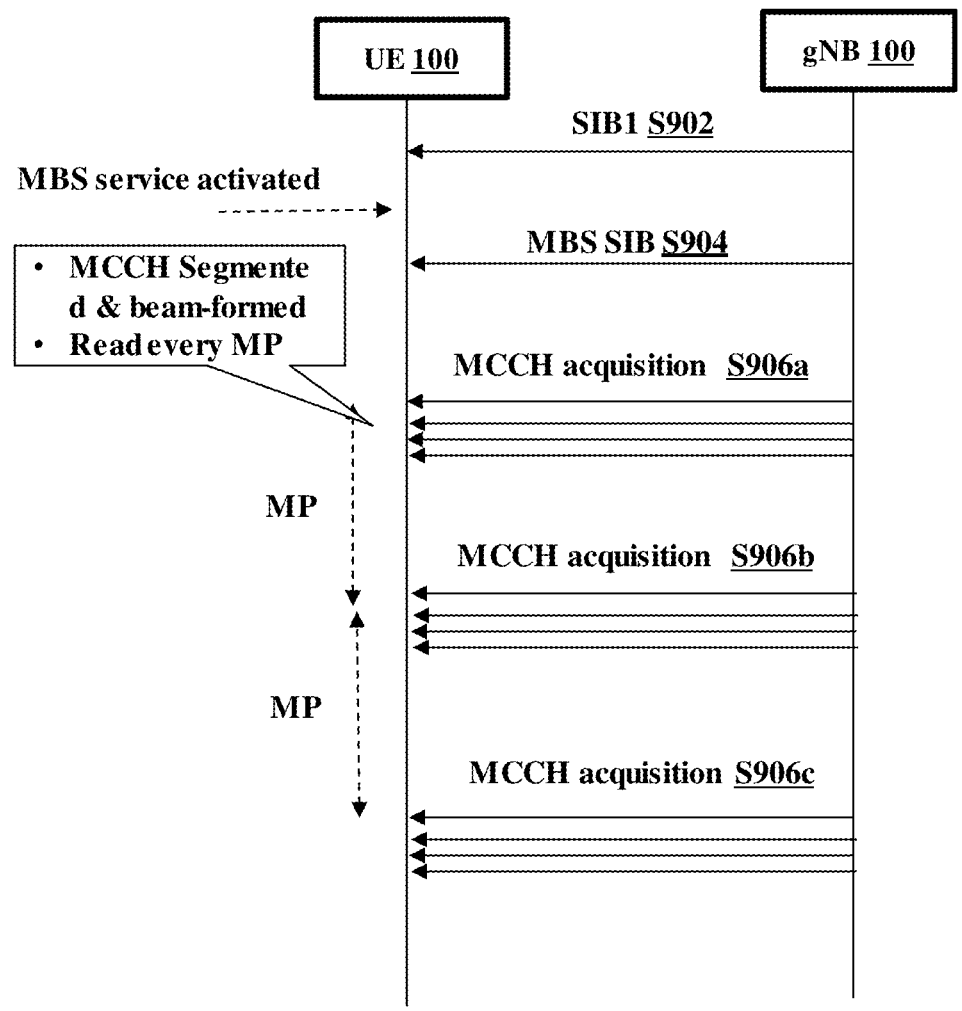
FIG. 9 is a sequence flow diagram illustrating step by step operations for the MCCH acquisition in the 5G wireless network, according to prior art.

FIG. 9 is a sequence flow diagram illustrating step by step operations for the MCCH acquisition in the 5G wireless network (1000), according to prior art.

At S902, the gNB (200) sends the SIB1 to the UE (100). The MBS service is activated at the UE (100). At S904, the gNB (200) sends the MBS SIB to the UE (100). At S906a-S906c, the gNB (200) sends the MCCH for the MCCH acquisition by the UE (100). The MCCH may be segmented (M segments) and is beam-formed across multiple beams in time-domain (N beams). Hence, the decoding MCCH at every modification period is a processing overhead for the UE and leads to excessive power consumption. There is a need for efficient approach for MCCH acquisition for UE power saving.

Figure 10:
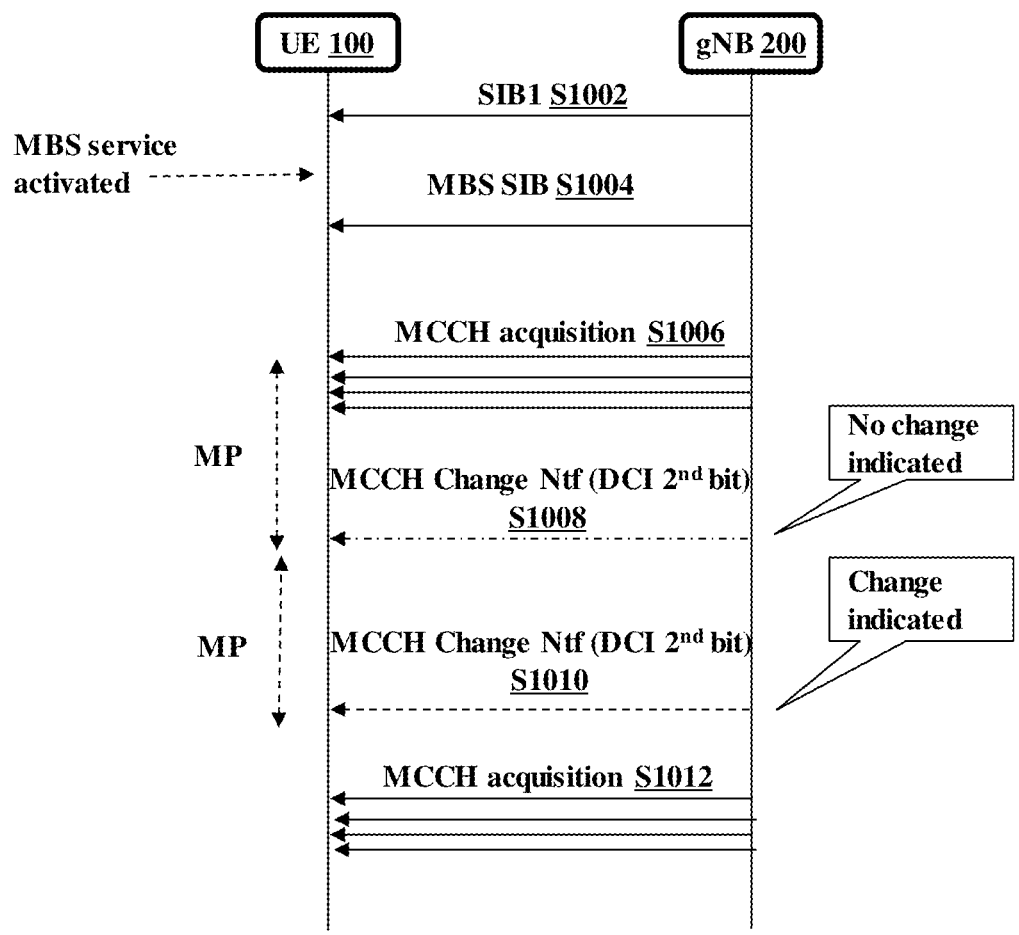
FIG. 10 is a sequence flow diagram illustrating step by step operations for the MCCH acquisition in the 5G wireless network, according to an embodiment as disclosed herein.

FIG. 10 is a sequence flow diagram illustrating step by step operations for the MCCH acquisition in the 5G wireless network (1000), according to an embodiment as disclosed herein.

At S1002, the gNB (200) sends the SIB1 to the UE (100). The MBS service is activated at the UE (100). At S1004, the gNB (200) sends the MBS SIB to the UE (100). At S1006a, the gNB (200) sends the MCCH for the MCCH acquisition by the UE (100). At S1008, the gNB (200) indicates no MCCH change through MCCH Change notification (DCI $2^{nd}$ bit) and UE (100) skips MCCH read in the current modification period. At S1010, gNB (200) indicates change in MCCH due to modification of an ongoing session's configuration (including session stop) provided with an explicit notification from the network (i.e., MCCH Change Notification (DCI 2nd bit)). For example, DCI $2^{nd}$ bit when set to 1, UE interprets this as MCCH change and when it is set to 0, UE interprets this as no change of MCCH. A reverse interpretation of the DCI $2^{nd}$ bit can also be applied. As described in other embodiments, DCI $2^{nd}$ bit may also represent at least one of modification of indication for modification to the MBS session configuration of the ongoing MBS session, an indication for a tops of MBS session and an indication for a neighbor cell information change and an indication for change of MCCH except start of a new session. At S1012, the gNB (200) sends the updated MCCH for the MCCH acquisition by the UE (100).

FIG. 11a to FIG. 11d are example flow charts (S1100a-S1100d) illustrating a method for the MCCH acquisition in the 5G wireless network (1000), according to an embodiment as disclosed herein.

Figure 11A:
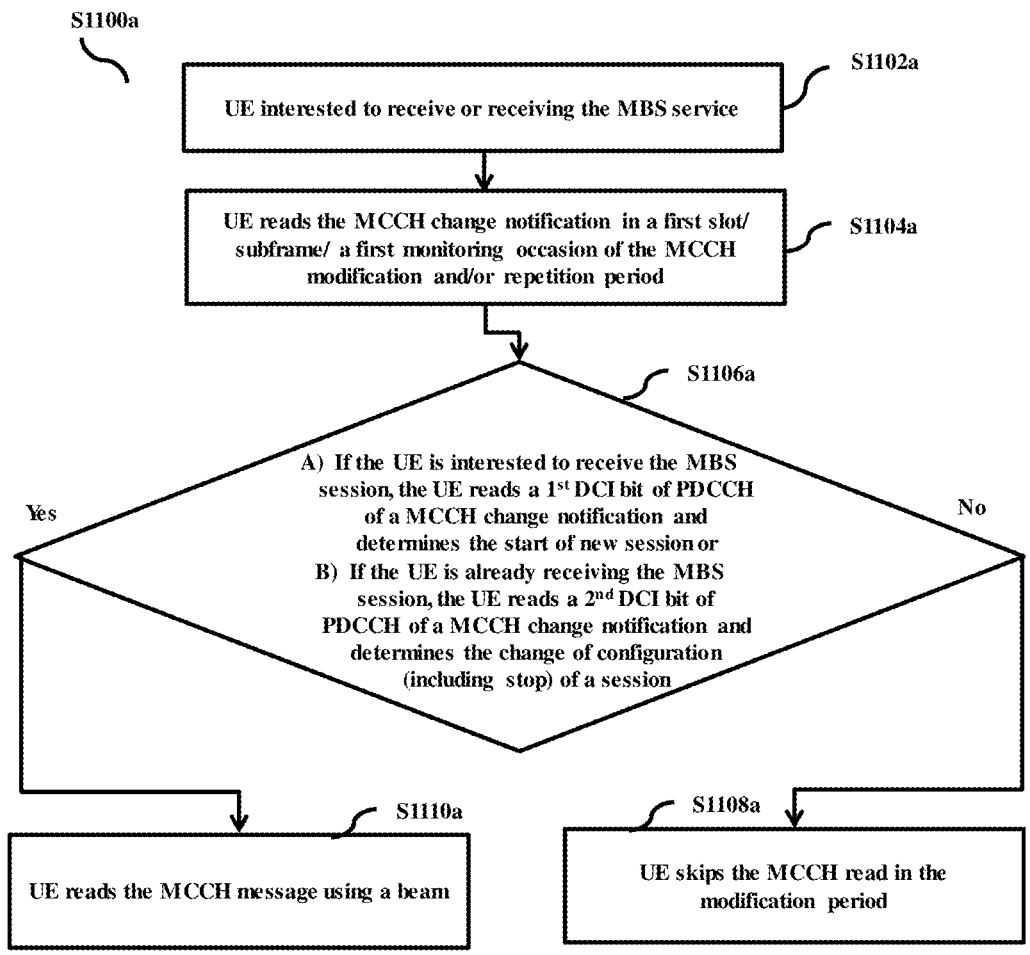
FIG. 11a to FIG. 11d are example flow charts illustrating a method for the MCCH acquisition in the 5G wireless network, according to an embodiment as disclosed herein.

As shown in the FIG. 11a, the operations (S1102a-S1110a) are handled by the MCCH acquisition controller (140). At S1102a, the UE (100) interested to receive or receiving the MBS service. At S1104a, the UE (100) reads the MCCH change notification in the first slot/sub-frame/the first monitoring occasion of the MCCH modification and/or repetition period. At S1106a, if the UE (100) is interested to receive the MBS session, the UE (100) reads a 1st DCI bit of PDCCH of the MCCH change notification and determines the start of new session or if the UE (100) is already receiving the MBS session, the UE (100) reads the 2nd DCI bit of PDCCH of the MCCH change notification and determines the change of configuration (including stop) of the session, then at S1110a, the UE (100) updates the MCCH by sweeping the beam; otherwise, at S1108a, the UE (100) skips the MCCH read in the modification period. Upon receiving a change notification with satisfying aforementioned conditions, the UE acquires the updated MCCH starting from the same slot.

Figure 11B:
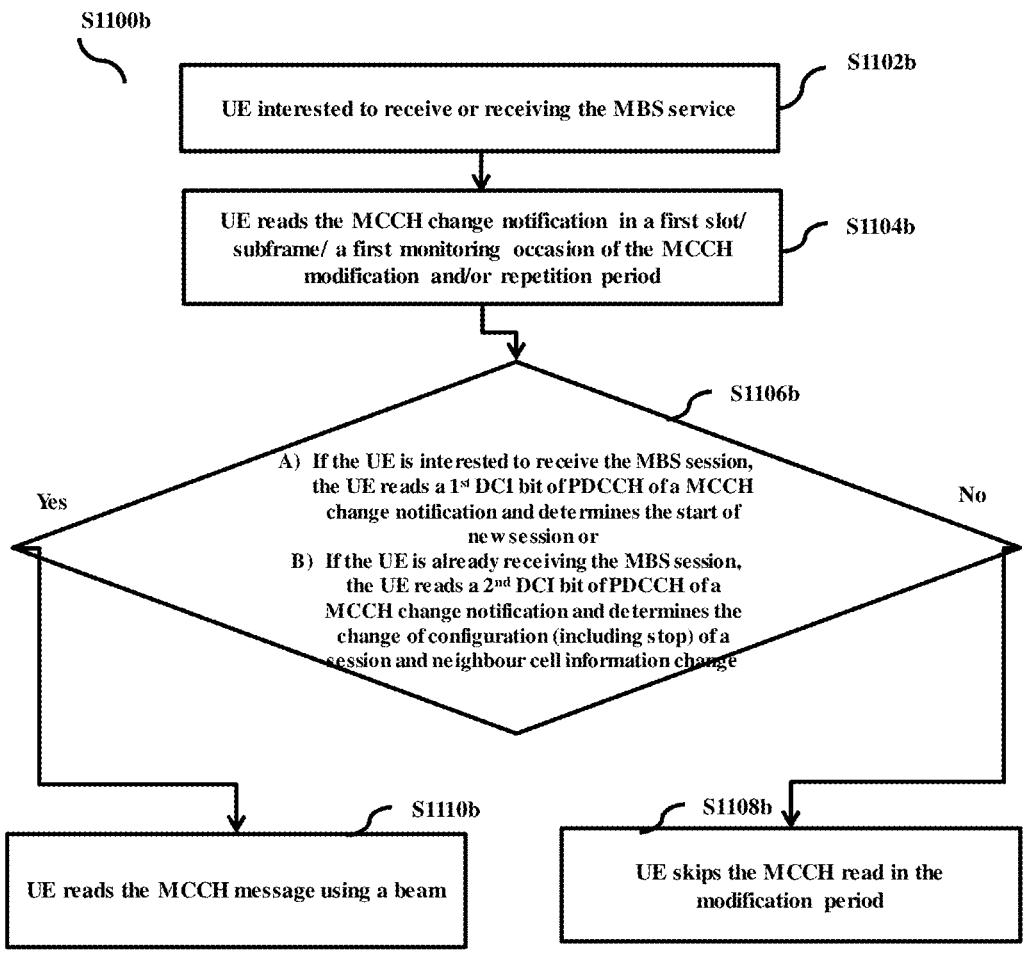

As shown in the FIG. 11b, the operations (S1102b-S1110b) are handled by the MCCH acquisition controller (140). At S1102b, the UE (100) interested to receive or receiving the MBS service. At S1104b, the UE (100) reads the MCCH change notification in the first slot/subframe/the first monitoring occasion of the MCCH modification and/or repetition period. At S1106b, if the UE (100) is interested to receive the MBS session, the UE (100) reads the 1st DCI bit of PDCCH of the MCCH change notification and determines the start of new session or if the UE (100) is already receiving the MBS session, the UE (100) reads the 2nd DCI bit of PDCCH of the MCCH change notification and determines the change of configuration (including stop) of the session and neighbour cell information change, then at S1110b, the UE (100) updates the MCCH by sweeping the beam; otherwise, at S1108b, the UE (100) skips the MCCH read in the modification period. Upon receiving a change notification with satisfying aforementioned conditions, the UE acquires the updated MCCH starting from the same slot.

Figure 11C:
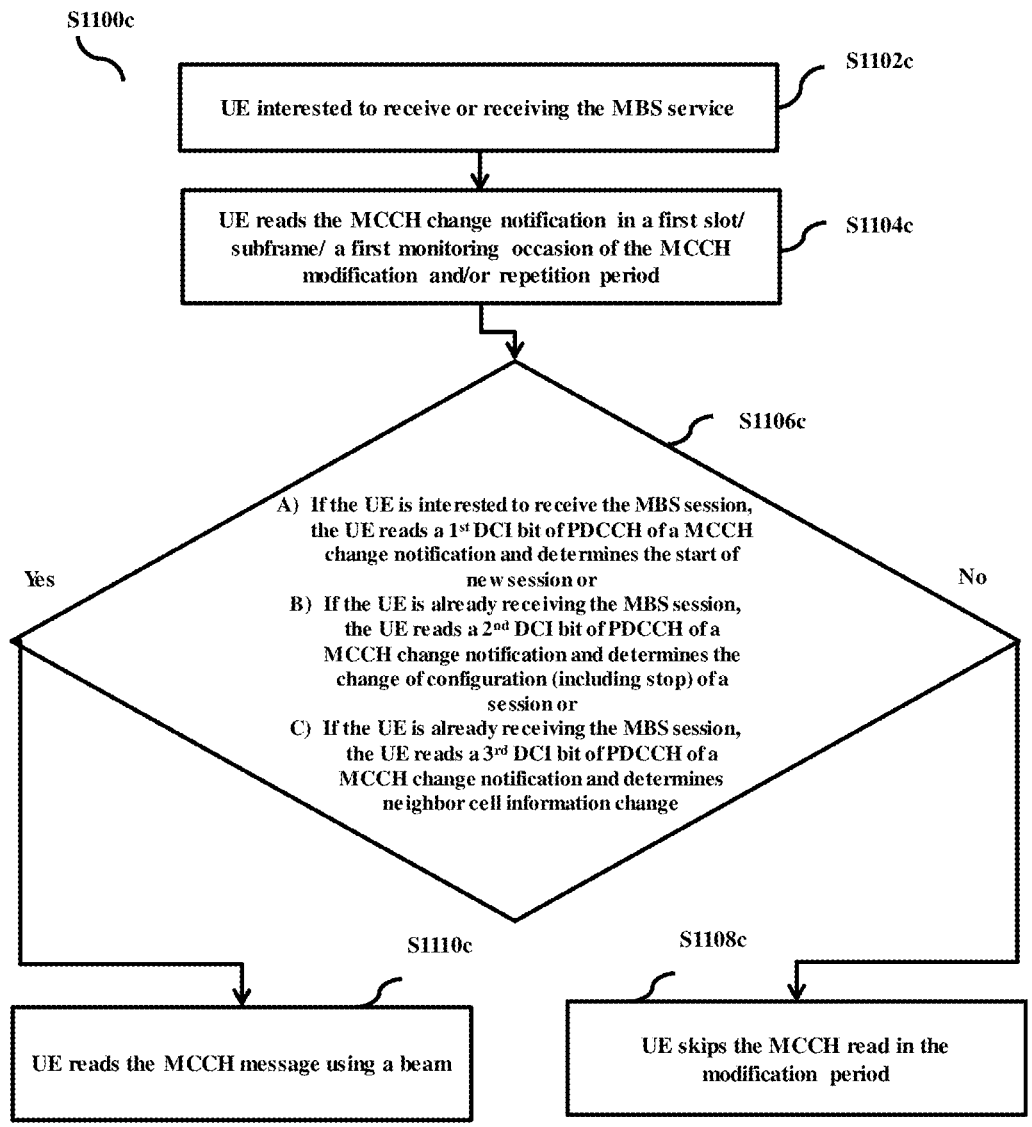

As shown in the FIG. 11c, the operations (S1102c-S1110c) are handled by the MCCH acquisition controller (140). At S1102c, the UE (100) interested to receive or receiving the MBS service. At S1104c, the UE (100) reads the MCCH change notification in the first slot/subframe/the first monitoring occasion of the MCCH modification and/or repetition period. At S1106c, if the UE (100) is interested to receive the MBS session, the UE (100) reads a $1^{st}$ DCI bit of PDCCH of the MCCH change notification and determines the start of new session or if the UE (100) is already receiving the MBS session, the UE (100) reads the 2nd DCI bit of PDCCH of the MCCH change notification and determines the change of configuration (including stop) of the session or if the UE (100) is already receiving the MBS session, the UE (100) reads a 3rd DCI bit of PDCCH of a MCCH change notification and determines neighbor cell information change, then at S1110c, the UE (100) updates the MCCH by sweeping the beam; otherwise, at S1108c, the UE (100) skips the MCCH read in the modification period. Upon receiving a change notification with satisfying aforementioned conditions, the UE acquires the updated MCCH starting from the same slot.

Figure 11D:
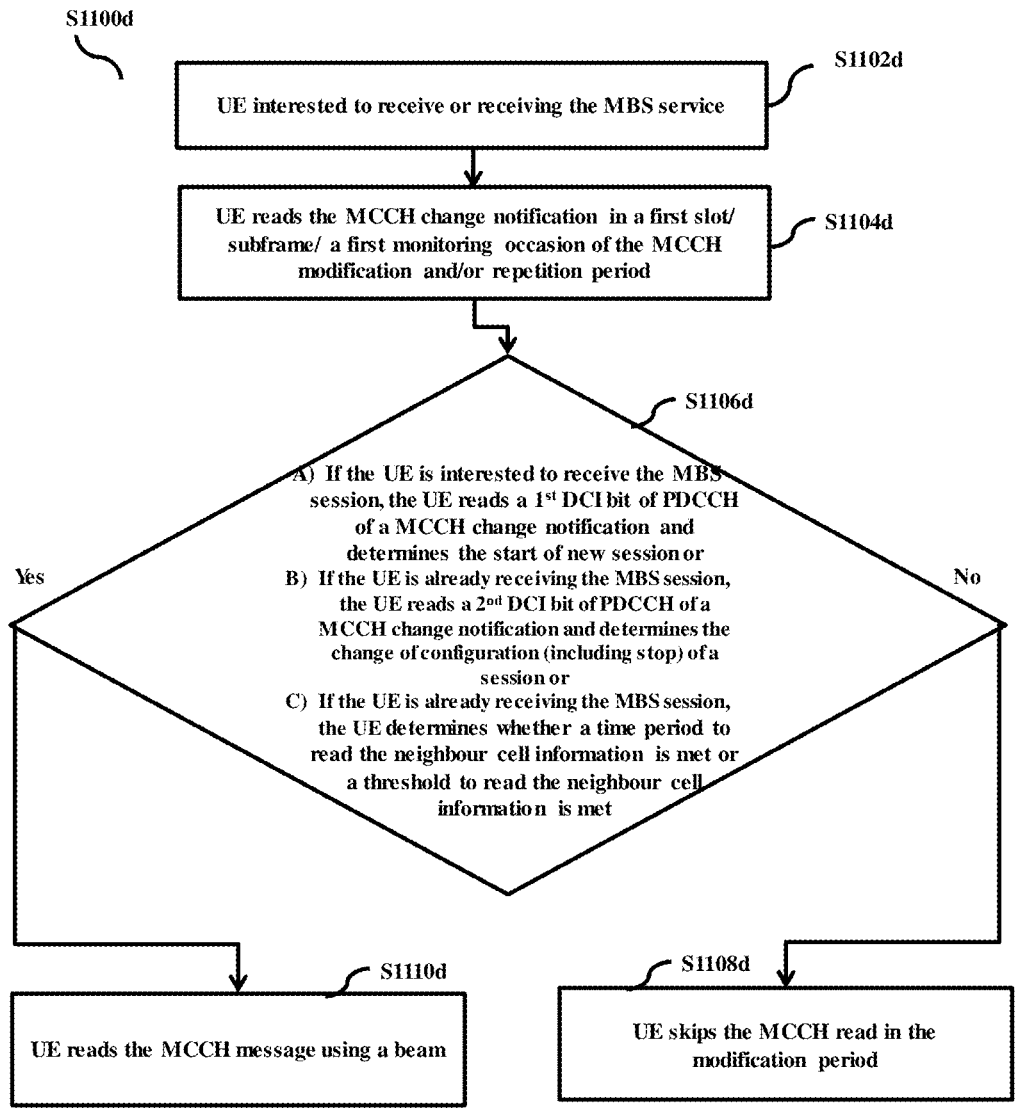

As shown in the FIG. 11d, the operations (S1102d-S1110d) are handled by the MCCH acquisition controller (140). At S1102d, the UE (100) interested to receive or receiving the MBS service. At S1104d, the UE (100) reads the MCCH change notification in the first slot/subframe/the first monitoring occasion of the MCCH modification and/or repetition period. At S1106d, if the UE (100) is interested to receive the MBS session, the UE (100) reads a 1st DCI bit of PDCCH of the MCCH change notification and determines the start of new session or if the UE (100) is already receiving the MBS session, the UE (100) reads the $2^{nd}$ DCI bit of PDCCH of the MCCH change notification and determines the change of configuration (including stop) of the session or if the UE (100) is already receiving the MBS session, the UE (100) determines whether the time period to read the neighbour cell information is met or a threshold to read the neighbour cell information is met, then at S1110d, the UE (100) updates the MCCH by sweeping the beam; otherwise, at S1108d, the UE (100) skips the MCCH read in the modification period. Upon receiving a change notification with satisfying aforementioned conditions, the UE acquires the updated MCCH starting from the same slot.

Figure 12:
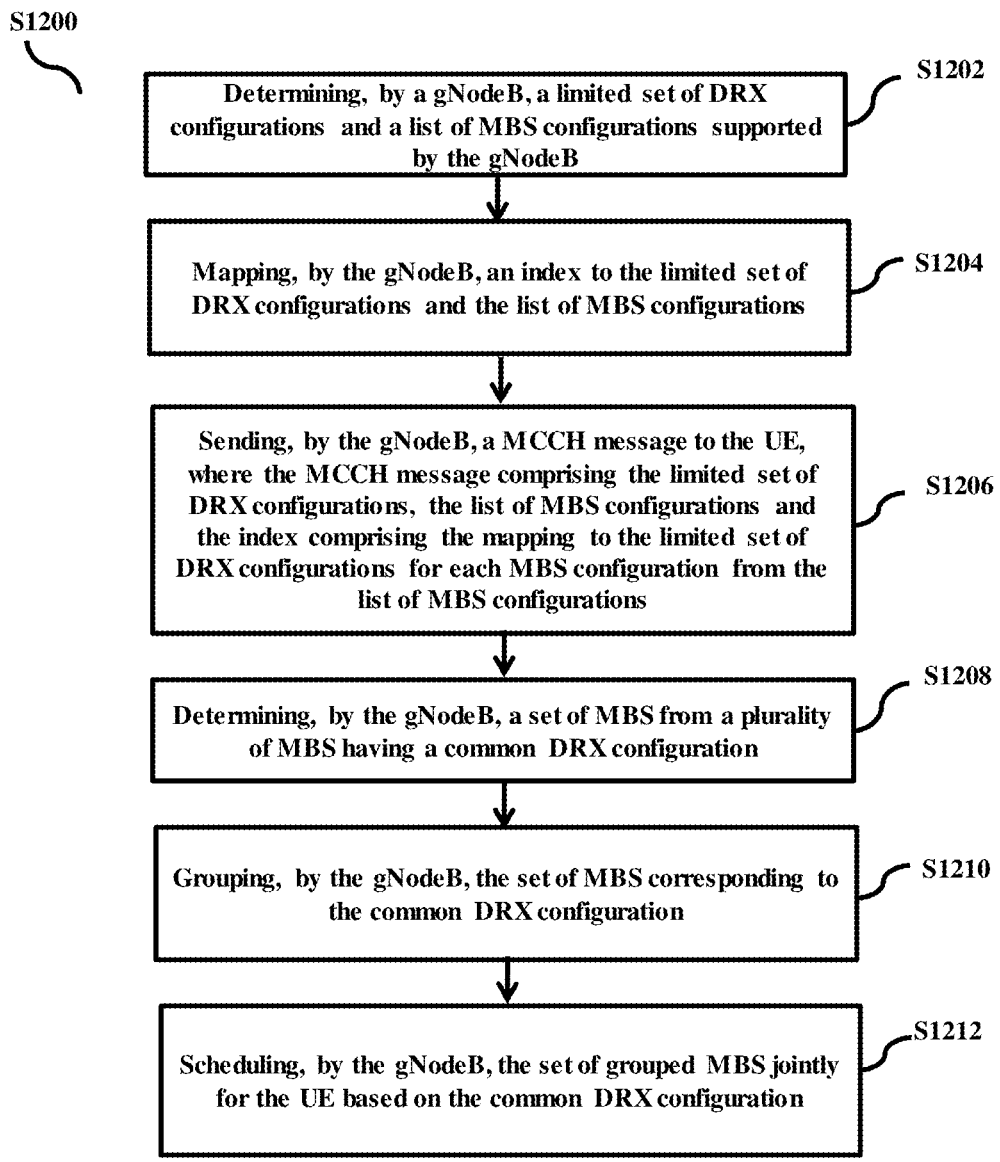
FIG. 12 is a flow chart illustrating a method, implemented by the gNodeB, for the DRX scheduling for the MBS in the 5G network by determining a limited set of DRX configurations and a list of MBS configurations supported by the gNodeB, according to an embodiment as disclosed herein.

FIG. 12 is a flow chart (S1200) illustrating a method, implemented by the gNodeB (200), for the DRX scheduling for the MBS in the 5G network (1000) by determining the limited set of DRX configurations and the list of MBS configurations supported by the gNodeB (200), according to an embodiment as disclosed herein. The operations (S1202-S1212) are handled by the DRX scheduling controller (250).

At S1202, the method includes determining the limited set of DRX configurations and the list of MBS configurations supported by the gNodeB (200). At S1204, the method includes mapping the index to the limited set of DRX configurations and the list of MBS configurations. At S1206, the method includes sending the MCCH message to the UE (100), where the MCCH message comprises the limited set of DRX configurations, the list of MBS configurations and the index comprising the mapping to the limited set of DRX configurations for each MBS configuration from the list of MBS configurations. At S1208, the method includes determining the set of MBS from the plurality of MBS having the common DRX configuration. At S1210, the method includes grouping the set of MBS corresponding to the common DRX configuration. At S1212, the method includes scheduling the set of grouped MBS jointly for the UE (100) based on the common DRX configuration.

Figure 13:
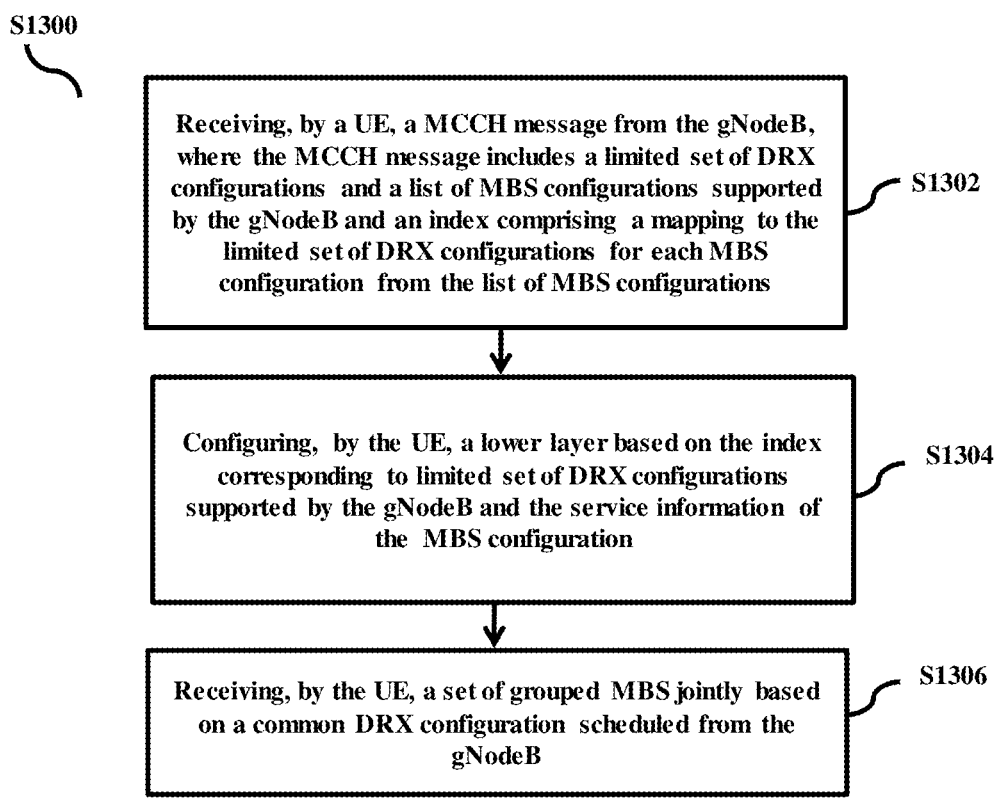
FIG. 13 is a flow chart illustrating a method, implemented by the UE, for the DRX scheduling for the MBS in the 5G network based on a MCCH message, according to an embodiment as disclosed herein.

FIG. 13 is a flow chart (S1300) illustrating a method, implemented by the UE (100), for the DRX scheduling for MBS in the 5G network (1000) based on the MCCH message, according to an embodiment as disclosed herein. The operations (S1302-S1306) are handled by the DRX scheduling controller (150). At S1302, the method includes receiving the MCCH message from the gNodeB (200). The MCCH message includes the limited set of DRX configurations and a list of MBS configurations supported by the gNodeB (200) and the index comprising a mapping to the limited set of DRX configurations for each MBS configuration from the list of MBS configurations. At S1304, the method includes configuring the lower layer based on the index corresponding to limited set of DRX configurations supported by the gNodeB (200) and the service information of the MBS configuration. At S1306, the method includes receiving the set of grouped MBS jointly based on the common DRX configuration scheduled from the gNodeB (200).

Figure 14:
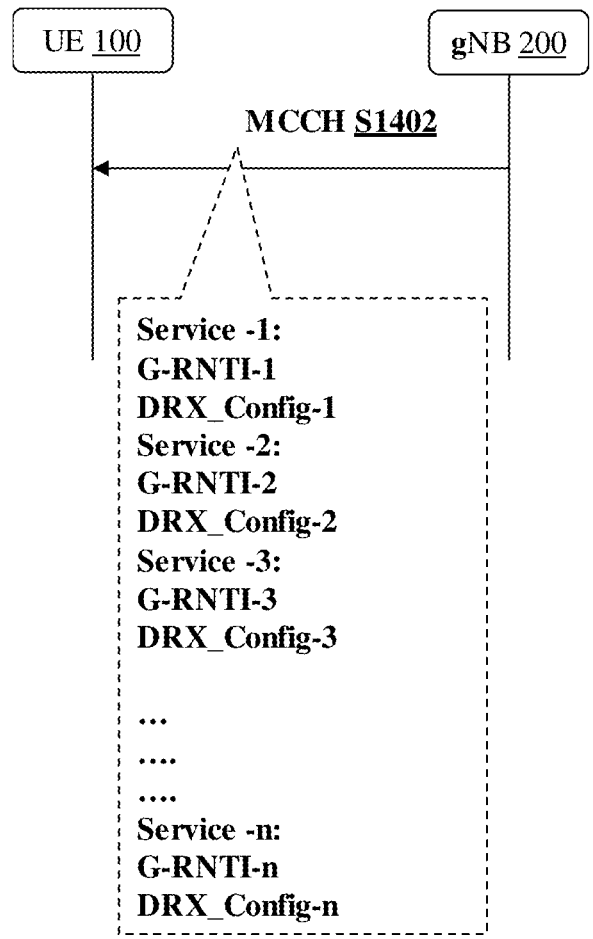
FIG. 14 is a sequence diagram illustrating step by step operations for the DRX scheduling for the MBS in the 5G network based on the MCCH message, according to a prior art.

FIG. 14 is a sequence diagram illustrating step by step operations for DRX scheduling for MBS in the 5G network (1000) based on the MCCH message, according to a prior art. At S1402, the gNodeB (200) sends the MCCH message to the UE (100). The MCCH message includes service-1: G-RNTI-1 and DRX_Config-1, Service-2: G-RNTI-2 and DRX_Config-2, Service-3: G-RNTI-3 and DRX_Config-3, and Service-n: G-RNTI-n and DRX_Config-n. Based on the existing method, even a small change in configuration or addition/removal of services will cause the UE (100) to suffer processing burden.

Figure 15:
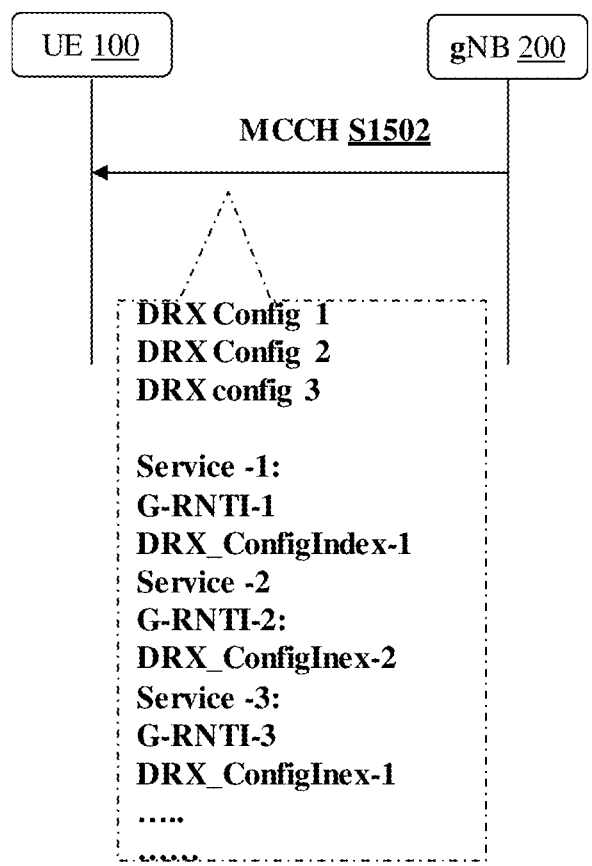
FIG. 15 is a sequence diagram illustrating step by step operations for the DRX scheduling for MBS in the 5G network based on the MCCH message, according to an embodiment as disclosed herein.

FIG. 15 is a sequence diagram illustrating step by step operations for DRX scheduling for MBS in the 5G network (1000) based on the MCCH message, according to an embodiment as disclosed herein. At S1502, the gNodeB (200) sends the MCCH message to the UE (100). Based on the proposed method, the gNodeB (200) sends the overall DRX configuration list in the beginning of MCCH message or through the broadcast System Information message. Only index to the DRX configuration is provided in each Service configuration. Further, the pre-defined DRX configuration to be included in specification and index can be used by the network (1000) for scheduling. Further, multiple services having common DRX scheduling configurations can be grouped together. The gNB (200) provides flexibility to the network (1000) to schedule multiple services jointly or support less capability UEs (100).

Figure 16:
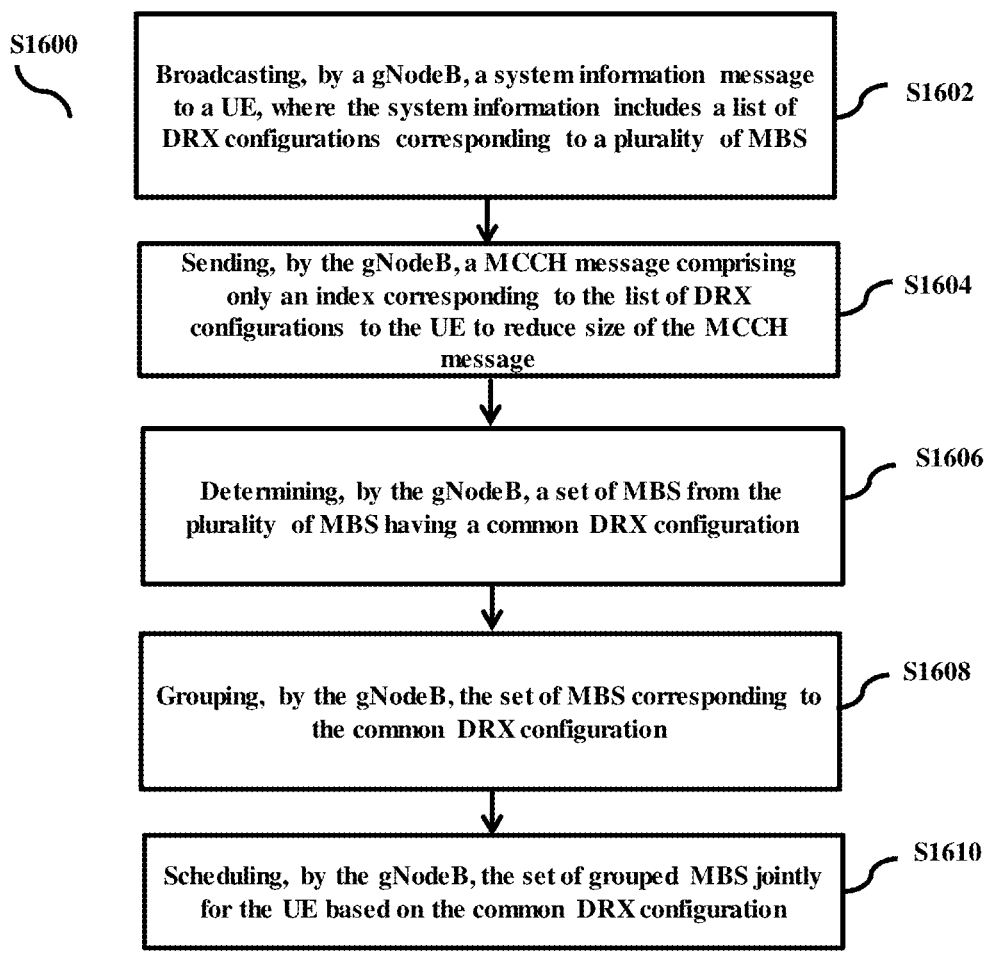
FIG. 16 is a flow chart illustrating a method, implemented by the gNodeB, for the DRX scheduling for the MBS in the 5G network based on a system information message, according to an embodiment as disclosed herein.

FIG. 16 is a flow chart (S1600) illustrating a method, implemented by the gNodeB (200), for the DRX scheduling for the MBS in the 5G network (1000) based on the system information message, according to an embodiment as disclosed herein. The operations (S1602-S1610) are handled by the DRX scheduling controller (250).

At S1602, the method includes broadcasting the system information message to the UE (100), where the system information includes the list of DRX configurations corresponding to the plurality of MBS. At S1604, the method includes sending the MCCH message comprising only the index corresponding to the list of DRX configurations to the UE (100) to reduce size of the MCCH message. At S1606, the method includes determining the set of MBS from the plurality of MBS having the common DRX configuration. At S1608, the method includes grouping the set of MBS corresponding to the common DRX configuration. At S1610, the method includes scheduling the set of grouped MBS jointly for the UE (100) based on the common DRX configuration.

Figure 17:
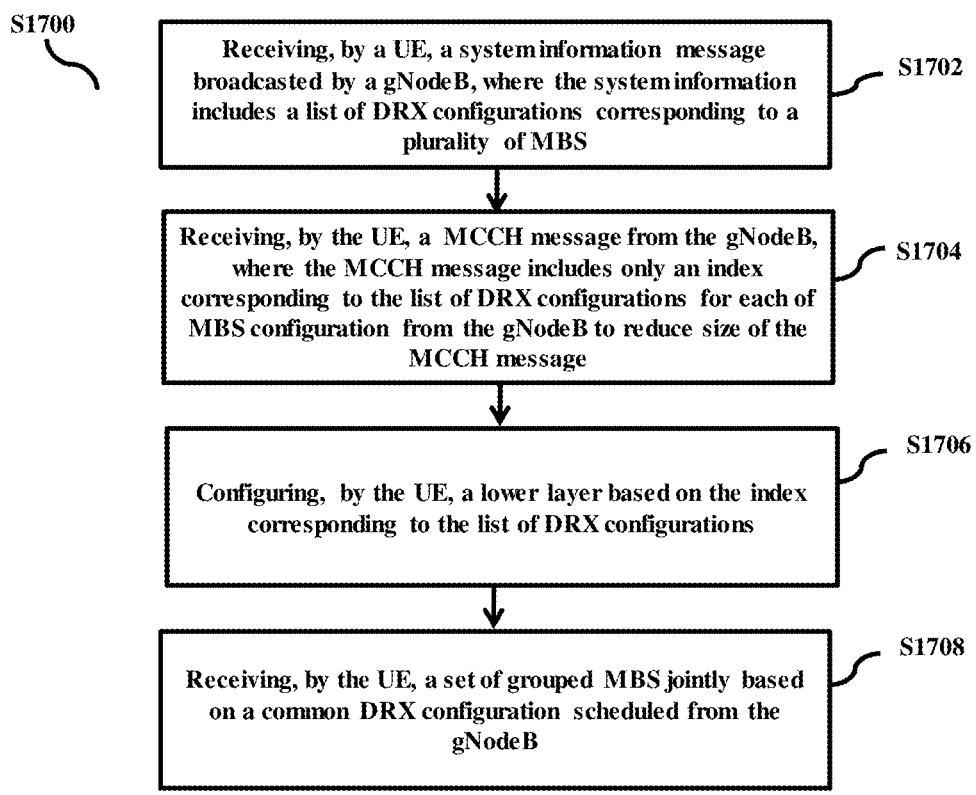
FIG. 17 is a flow chart illustrating a method, implemented by the UE, for the DRX scheduling for the MBS in the 5G network based on the system information message, according to an embodiment as disclosed herein.

FIG. 17 is a flow chart (S1700) illustrating a method, implemented by the UE (100), for the DRX scheduling for the MBS in the 5G network (1000) based on the system information message, according to an embodiment as disclosed herein. The operations (S1702-S1708) are handled by the DRX scheduling controller (150).

At S1702, the method includes receiving the system information message broadcasted by the gNodeB (200). The system information includes the list of DRX configurations corresponding to the plurality of MBS. At S1704, the method includes receiving the MCCH message from the gNodeB (200). The MCCH message includes only an index corresponding to the list of DRX configurations for each of MBS configuration from the gNodeB to reduce size of the MCCH message. At S1706, the method includes configuring the lower layer based on the index corresponding to the list of DRX configurations. At S1708, the method includes receiving the set of grouped MBS jointly based on a common DRX configuration scheduled from the gNodeB (200).

Figure 18:
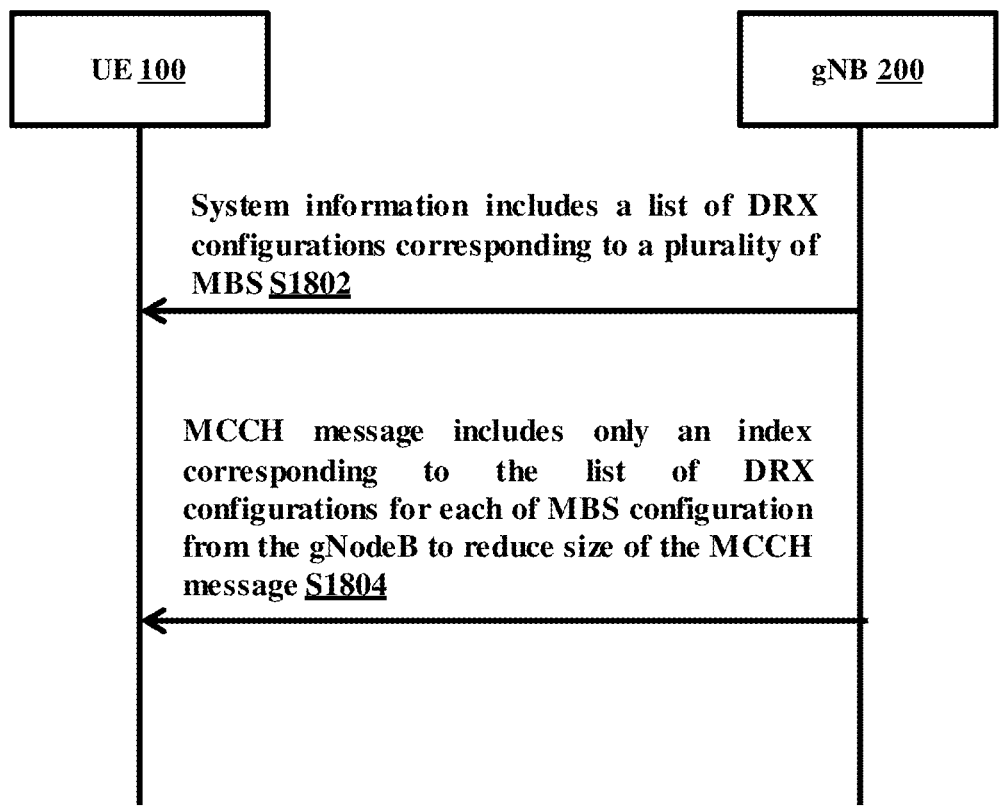
FIG. 18 is a sequence diagram illustrating step by step operations for the DRX scheduling for the MBS in the 5G network based on the system information message, according to an embodiment as disclosed herein.

FIG. 18 is a sequence diagram illustrating step by step operations for the DRX scheduling for the MBS in the 5G network (1000) based on the system information message, according to an embodiment as disclosed herein. At S1802, the gNB (200) sends the system information including the list of DRX configurations corresponding to the plurality of MBS to the UE (100). At S1804, the gNB (200) sends the MCCH message including only the index corresponding to the list of DRX configurations for each of MBS configuration to reduce size of the MCCH message.

Figure 19:
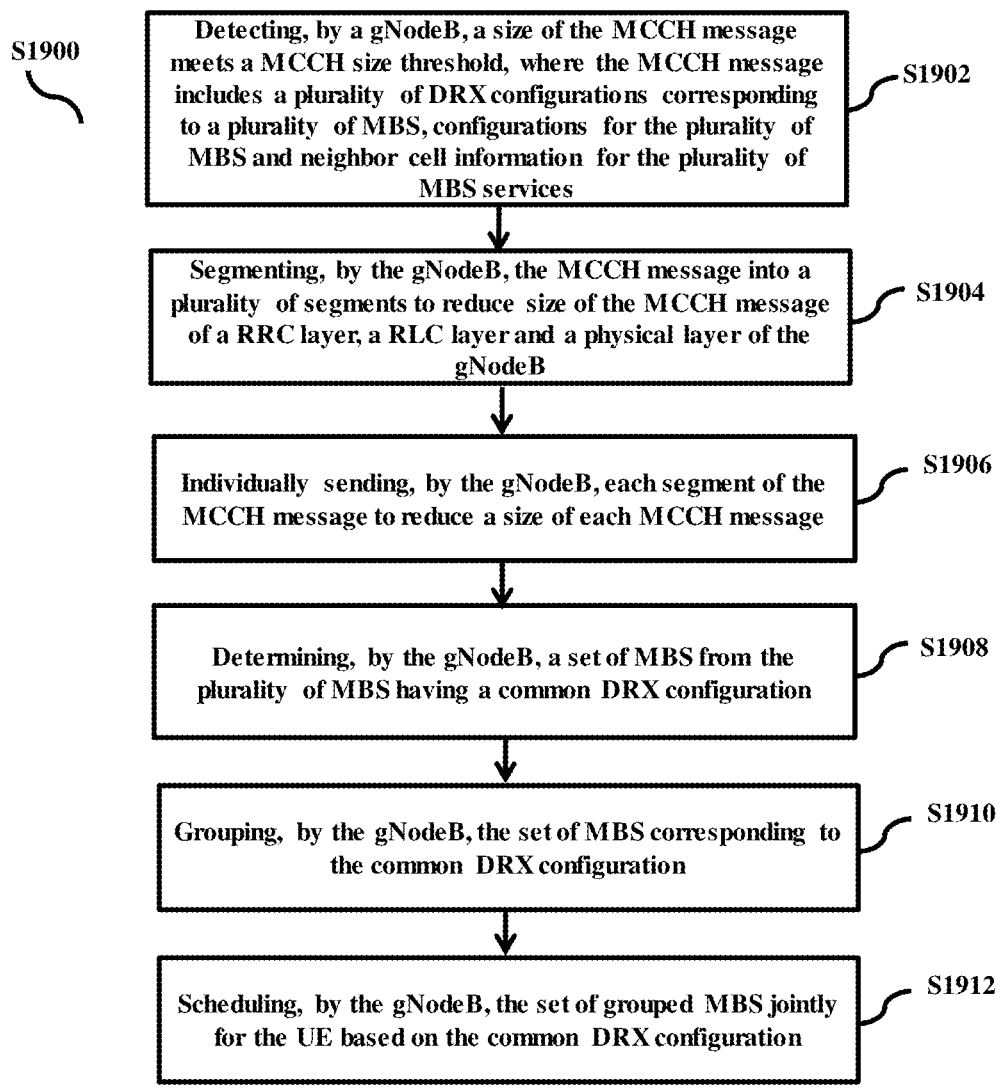
FIG. 19 is a flow chart illustrating a method, implemented by the gNodeB, for the DRX scheduling for the MBS in the 5G network based on a size of the MCCH message, according to an embodiment as disclosed herein.

FIG. 19 is a flow chart (S1900) illustrating a method, implemented by the gNodeB (200), for DRX scheduling for the MBS in the 5G network (1000) based on the size of the MCCH message, according to an embodiment as disclosed herein. The operations (S1902-S1912) are handled by the DRX scheduling controller (250).

At S1902, the method includes detecting the size of the MCCH message meets the MCCH size threshold. The MCCH message includes the plurality of DRX configurations corresponding to the plurality of MBS, configurations for the plurality of MBS and neighbor cell information for the plurality of MBS services. At S1904, the method includes segmenting the MCCH message into the plurality of segments to reduce size of the MCCH message of the RRC layer, the RLC layer and the physical layer of the gNodeB. At S1906, the method includes individually sending each segment of the MCCH message to reduce the size of each MCCH message. At S1908, the method includes determining the set of MBS from the plurality of MBS having the common DRX configuration. At S1910, the method includes grouping the set of MBS corresponding to the common DRX configuration. At S1910, the method includes scheduling the set of grouped MBS jointly for the UE (100) based on the common DRX configuration.

Figure 20:
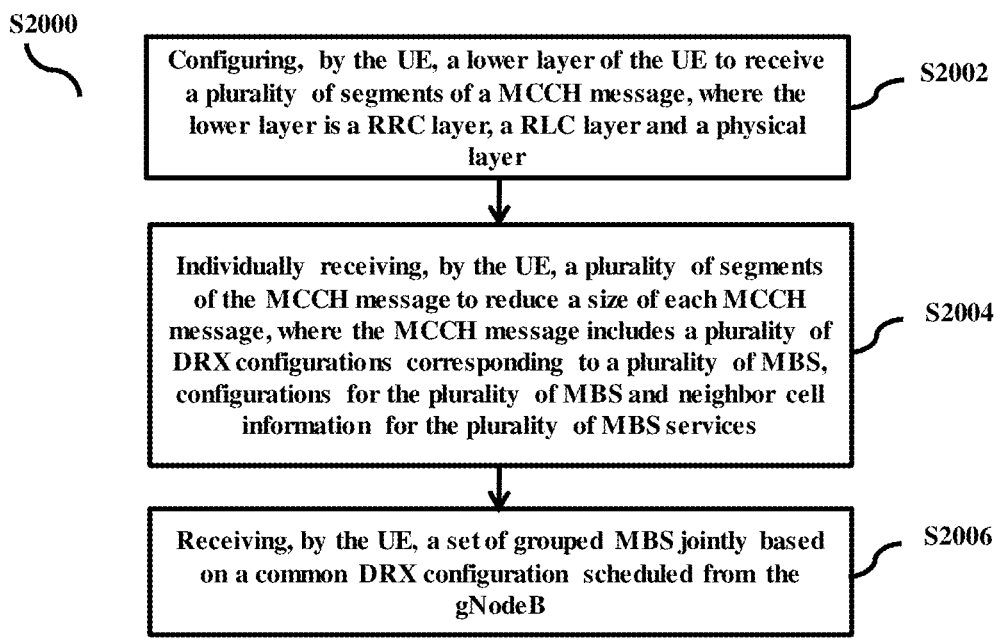
FIG. 20 is a flow chart illustrating a method, implemented by the UE, for the DRX scheduling for the MBS in the 5G network based on the size of the MCCH message, according to an embodiment as disclosed herein.

FIG. 20 is a flow chart (S2000) illustrating a method, implemented by the UE (100), for the DRX scheduling for the MBS in the 5G network (1000) based on the size of the MCCH message, according to an embodiment as disclosed herein. The operations (S2002-S2006) are handled by the DRX scheduling controller (150).

At S2002, the method includes configuring the lower layer of the UE to receive the plurality of segments of the MCCH message, where the lower layer can be, for example, but not limited to the RRC layer, the RLC layer and the physical layer. At S2004, the method includes individually receiving the plurality of segments of the MCCH message to reduce the size of each MCCH message. The MCCH message includes the plurality of DRX configurations corresponding to the plurality of MBS, configurations for the plurality of MBS and neighbor cell information for the plurality of MBS services. At S2006, the method includes receiving the set of grouped MBS jointly based on the common DRX configuration scheduled from the gNodeB (200).

Figure 21:
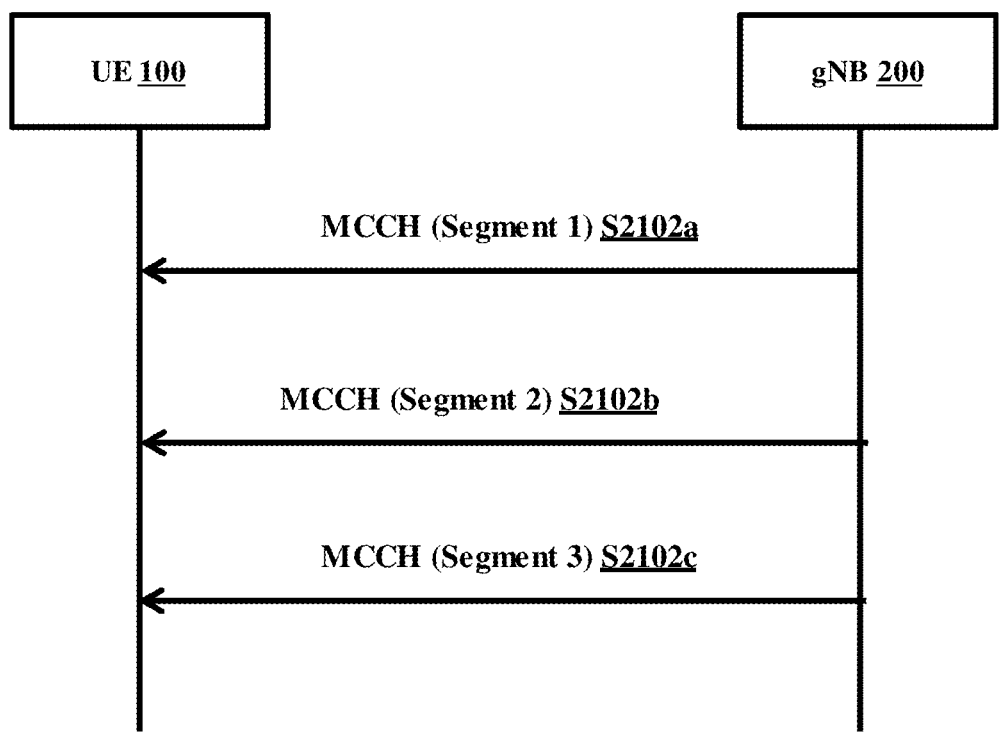
FIG. 21 is a sequence diagram illustrating step by step operations for the DRX scheduling for the MBS in the 5G network based on the size of the MCCH message, according to an embodiment as disclosed herein.

FIG. 21 is a sequence diagram illustrating step by step operations for the DRX scheduling for the MBS in the 5G network (1000) based on the size of the MCCH message, according to an embodiment as disclosed herein. At S2102a-S2102c, the UE (100) individually receives the plurality of segments of the MCCH message to reduce the size of each MCCH message. The MCCH message includes the plurality of DRX configurations corresponding to the plurality of MBS, configurations for the plurality of MBS and neighbor cell information for the plurality of MBS services.

Figure 22:
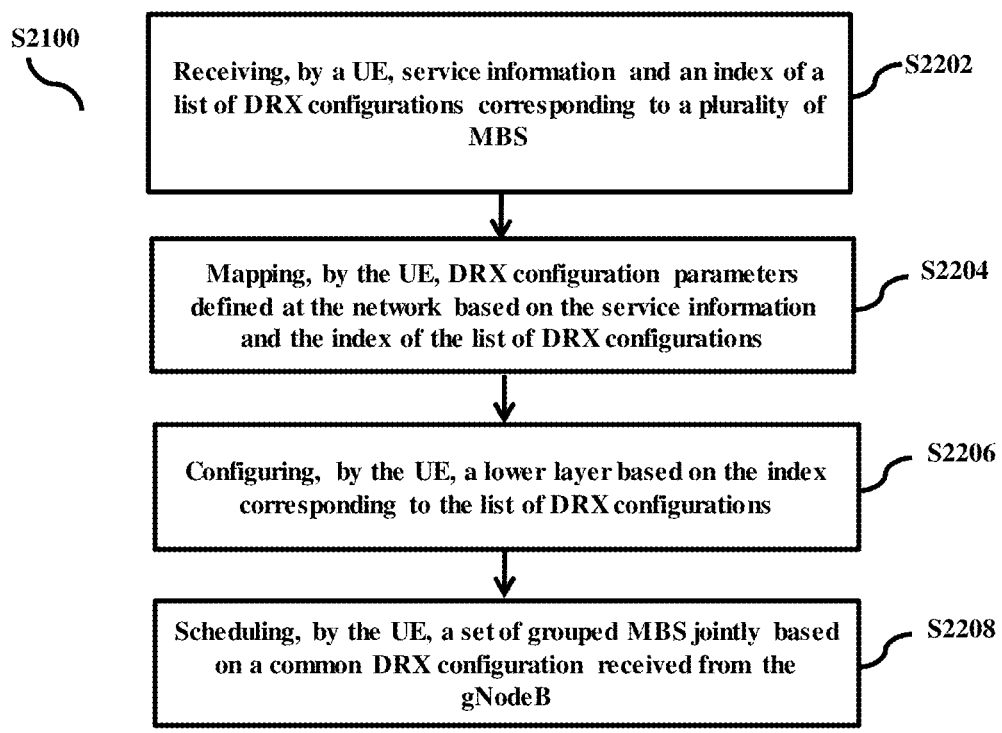
FIG. 22 is a flow chart illustrating a method, implemented by the UE, for DRX scheduling for the MBS in the 5G network based on the service information and an index of a list of DRX configurations corresponding to a plurality of MBS, according to an embodiment as disclosed herein.

FIG. 22 is a flow chart (S2200) illustrating a method, implemented by the UE (100), for DRX scheduling for the MBS in the 5G network (1000) based on the service information and an index of a list of DRX configurations corresponding to a plurality of MBS, according to an embodiment as disclosed herein. The operations (S2202-S2208) are handled by the DRX scheduling controller (150).

At S2202, the method includes receiving the service information and the index of the list of DRX configurations corresponding to the plurality of MBS. At S2204, the method includes mapping the DRX configuration parameters defined at the network (1000) based on the service information and the index of the list of DRX configurations. At S2206, the method includes configuring the lower layer based on the index corresponding to the list of DRX configurations. At S2208, the method includes scheduling the set of grouped MBS jointly based on the common DRX configuration received from the gNodeB (200).

Figure 23:
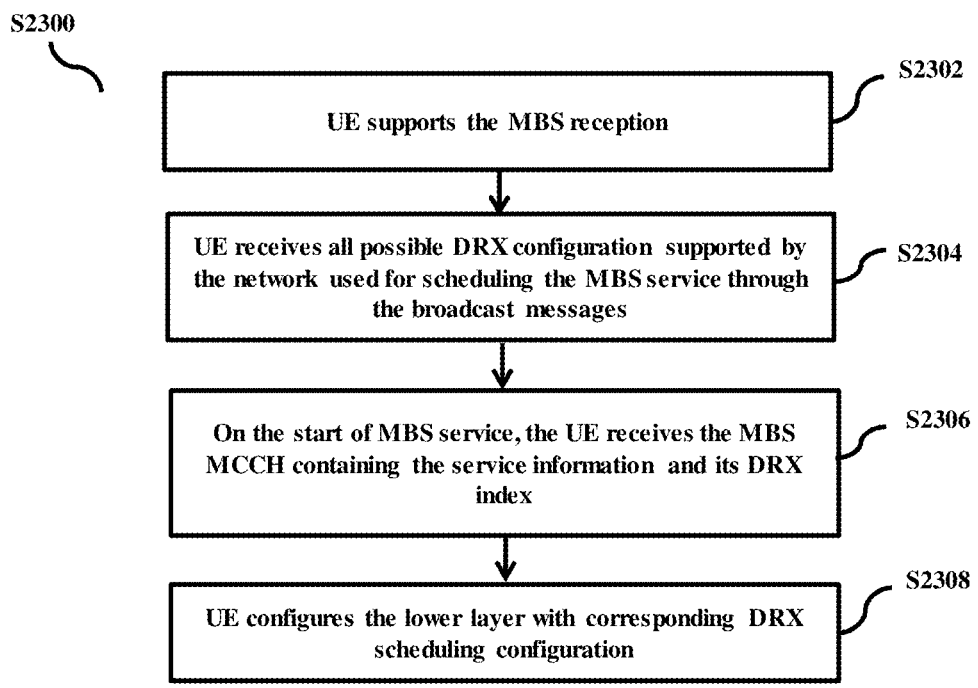
FIG. 23-FIG. 26 are example flow charts illustrating a method, implemented by the UE, for DRX scheduling for the MBS in the 5G network, according to an embodiment as disclosed herein.
Figure 26:
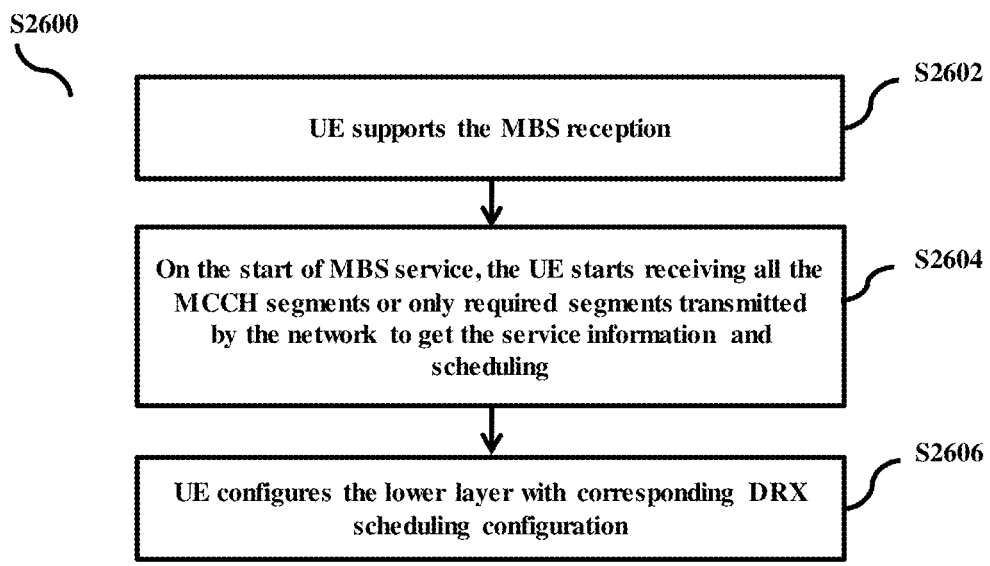

FIG. 23-FIG. FIG. 26 are example flow chart (S2300-S2600) illustrating a method, implemented by the UE (100), for DRX scheduling for the MBS in the 5G network (1000), according to an embodiment as disclosed herein.

As shown in the FIG. 23, the operations (S2302-S2308) are handled by the DRX scheduling controller (150). At S2302, the UE (100) supports the MBS reception. At S2304, the UE (100) receives all possible DRX configuration supported by the network (1000) used for scheduling the MBS service through the broadcast messages. At S2306, on the start of MBS service, the UE (100) receives the MBS MCCH containing the service information and its DRX index. At S2308, the UE (100) configures the lower layer with corresponding DRX scheduling configuration.

Figure 24:
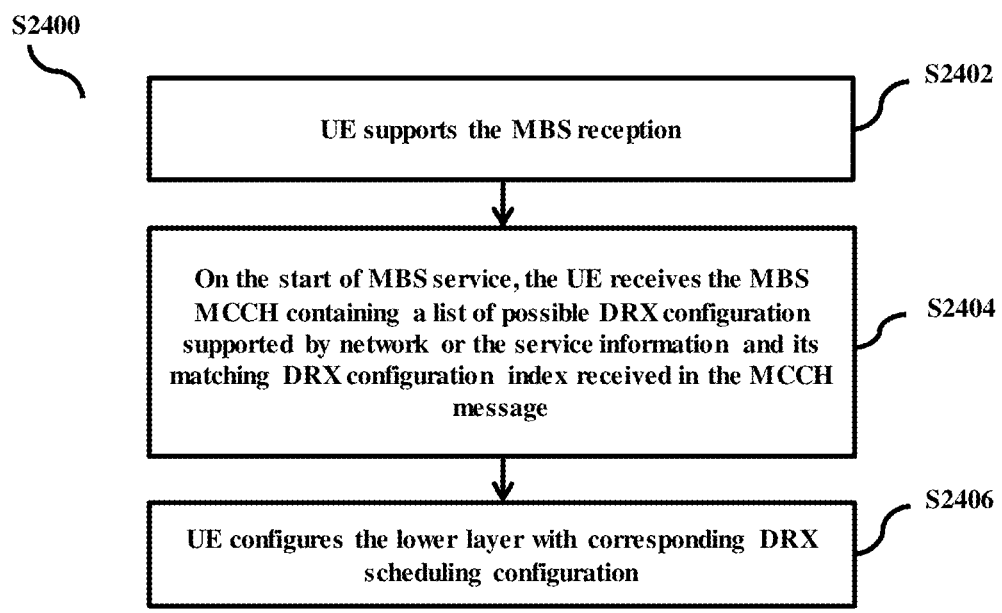

As shown in the FIG. 24, the operations (S2302-S2406) are handled by the DRX scheduling controller (150). At S2402, the UE (100) supports the MBS reception. At S2404, on the start of MBS service, the UE (100) receives the MBS MCCH containing a list of possible DRX configuration supported by network (1000) or the service information and its matching DRX configuration index received in the MCCH message. At S2406, the UE (100) configures the lower layer with corresponding DRX scheduling configuration.

Figure 25:
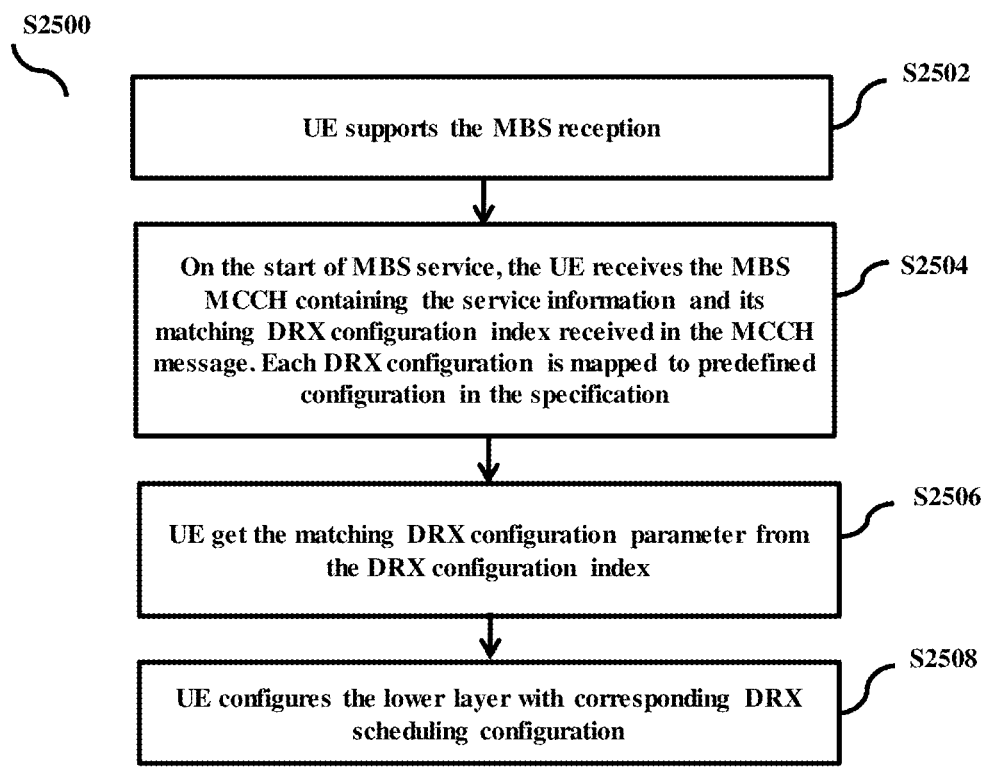

As shown in the FIG. 25, the operations (S2502-S2508) are handled by the DRX scheduling controller (150). At S2502, the UE (100) supports the MBS reception. At S2504, on the start of MBS service, the UE (100) receives the MBS MCCH containing the service information and its matching DRX configuration index received in the MCCH message. Each DRX configuration is mapped to predefined configuration in the specification. At S2506, the UE (100) gets the matching DRX configuration parameter from the DRX configuration index. At S2508, the UE (100) configures the lower layer with corresponding DRX scheduling configuration.

As shown in the FIG. 26, the operations (S2602-S2606) are handled by the DRX scheduling controller (150). At S2602, the UE (100) supports the MBS reception. At S2604, on the start of MBS service, the UE (100) starts receiving all the MCCH segments or only required segments transmitted by the network (1000) to get the service information and scheduling. At S2606, the UE (100) configures the lower layer with corresponding DRX scheduling configuration.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

What is claimed is:

1. A method for MBS (Multicast and Broadcast Service) Control Channel (MCCH) acquisition in a $5^{th}$ generation (5G) wireless network, wherein the method comprises:
   establishing, by a user equipment (UE), a MBS session with a gNodeB;
   receiving, by the UE, a MCCH change notification from the gNodeB over a Physical Downlink Control Channel (PDCCH), wherein the MCCH change notification comprises a first bit indicating a start of a new MBS session and a second bit indicating modification to a MBS session configuration of the ongoing MBS session;
   detecting, by the UE, whether at least one of the UE is interested to receive new MBS data and the UE is already receiving MBS data; and
   performing, by the UE, at least one of:
      determining whether the new MBS session has started for the new MBS data by reading the first bit of the MCCH change notification in response to detecting that the UE is interested to receive the new MBS data, and
      determining whether the modification to the MBS session configuration of the ongoing MBS session has occurred by reading the second bit of the MCCH change notification in response to detecting that the UE is already receiving the MBS data,
      wherein the method comprises the UE skipping reading of a MCCH message when it has been detected that the UE is already receiving the MBS data and it has been determined that the modification to the MBS session configuration has not occurred.

2. The method as claimed in claim 1, wherein the method comprises reading, by the UE, a MCCH message using at least one beam based on one of the start of the new MBS session for the new MBS data and the modification to the MBS session configuration of the ongoing MBS session.

3. The method as claimed in claim 1, wherein receiving, by the UE, the MCCH change notification from the gNodeB over the PDCCH comprises:
   reading, by the UE, the MCCH change notification through a Downlink Control Information (DCI) in at least one of a first sub-frame, a first slot and first monitoring occasion of the MCCH modification and repetition period.

4. The method as claimed in claim 1, wherein the second bit also comprises at least one of an indication for neighbour cell information change, an indication for a stop of an ongoing MBS session, and an indication for change of MCCH except start of a new session.

5. The method as claimed in claim 4, wherein the method comprises determining, by the UE, the neighbour cell information change by reading the second bit of the MCCH change notification including the neighbour cell information change.

6. The method as claimed in claim 1, wherein the MCCH change notification comprises a third bit indicating a neighbour cell information change.

7. The method as claimed in claim 6, wherein the method comprises determining, by the UE, the neighbour cell information change by reading the third bit of the MCCH change notification including the neighbour cell information change.

8. The method as claimed in claim 7, wherein the method comprises:
   determining, by the UE, whether a time period to read the neighbour cell information is met or a threshold to read the neighbour cell information is met; and
   reading, by the UE, the MCCH to obtain neighbour cell information in response to determining that the time period to read the neighbour cell information is met or the threshold to read the neighbour cell information is met.

9. A method for MBS (Multicast and Broadcast Service) Control Channel (MCCH) acquisition in a 5th Generation (5G) wireless network, wherein the method comprises:
   establishing, by a gNodeB, an MBS session with a user equipment (UE);
   modifying, by the gNodeB, an MBS session configuration of the ongoing MBS session, wherein the modification to the MBS session includes change in MCCH contents;
   creating, by the gNodeB, a MCCH change notification comprising a first bit indicating a new MBS session has started and a second bit indicating whether the modification to the MBS session configuration of the ongoing MBS session has occurred; and
   transmitting, by the gNodeB, the MCCH change notification to the UE over a Physical Downlink Control Channel (PDCCH),
   wherein the UE skips reading of a MCCH message when the UE is interested in receiving the new MBS session and the received first bit indicates the new MBS session has not started.

10. The method as claimed in claim 9, wherein the MCCH change notification is transmitted to the UE over at least one of a PDCCH that schedules the MCCH, and a PDCCH that is different from PDCCH scheduling MCCH and uses a separate RNTI than that for PDCCH that schedules the MCCH.

11. The method as claimed in claim 9, wherein the MCCH change notification is transmitted to the UE through a Downlink Control Information (DCI) in at least one of a first sub-frame, a first slot and first monitoring occasion of the MCCH modification and repetition period.

12. The method as claimed in claim 9, wherein the MCCH change notification comprises a third bit indicating a neighbour cell information change.

13. The method as claimed in claim 9, wherein the method comprises configuring, by the gNodeB, at least one of a time period and a threshold to read neighbour cell information for the UE.

14. The method as claimed in claim 9, wherein the second bit also comprises at least one of an indication for a neighbour cell information change, an indication for a stop of an ongoing MBS session and an indication for change of MCCH except start of a new session.

15. The method as claimed in claim 1 further comprises the UE skipping reading of a MCCH message when the UE is interested in receiving the new MBS session and it has been determined that the new MBS session has not started.

16. The method as claimed in claim 9 further comprises the UE skips reading of a MCCH message when the UE is already receiving MBS data and the received second bit indicates the modification to the MBS session configuration has not occurred.

* * * * *